United States Patent [19]

Chung et al.

[11] Patent Number: 5,348,673
[45] Date of Patent: Sep. 20, 1994

[54] MULTIFUNCTIONAL VISCOSITY INDEX IMPROVER DERIVED FROM AMIDO-AMINE AND DEGRADED ETHYLENE COPOLYMER EXHIBITING IMPROVED LOW TEMPERATURE VISCOMETRIC PROPERTIES

[75] Inventors: David Y. Chung, Edison; Antonio Gutierrez, Mercerville; Mark J. Struglinski, Bridgewater, all of N.J.

[73] Assignee: Exxon Chemical Patents Inc., Linden, N.J.

[21] Appl. No.: 163,601

[22] Filed: Dec. 8, 1993

Related U.S. Application Data

[62] Division of Ser. No. 848,817, Mar. 10, 1992, Pat. No. 5,290,461.

[51] Int. Cl.$^5$ .................................... C10M 149/06
[52] U.S. Cl. ................... 252/47; 252/47.5; 252/51.5 A; 585/10; 585/12; 525/300; 525/301
[58] Field of Search .............. 252/51.5 A, 47, 47.5; 585/10, 12; 525/300, 301

[56] References Cited

U.S. PATENT DOCUMENTS

| | | | |
|---|---|---|---|
| 3,313,793 | 4/1967 | De la Mare et al. | 260/94.7 |
| 3,316,177 | 4/1967 | Dorer, Jr. | 252/51.5 |
| 3,326,804 | 6/1967 | Hu | 252/34 |
| 3,332,926 | 7/1967 | Baron et al. | 260/93.7 |
| 3,345,352 | 10/1967 | Baron et al. | 260/93.7 |
| 3,687,849 | 8/1972 | Abbott | 252/47.5 |
| 3,687,905 | 8/1972 | Dorer | 260/78.4 D |
| 3,769,216 | 10/1973 | Gordon et al. | 252/51.5 R |
| 4,074,033 | 2/1978 | Wolinski et al. | 526/47 |
| 4,089,794 | 5/1978 | Engel | 252/51.5 A |
| 4,113,636 | 9/1978 | Engel et al. | 252/51.5 R |
| 4,132,661 | 1/1979 | Waldbillig et al. | 252/51.5 A |
| 4,137,185 | 1/1979 | Gardiner et al. | 252/33 |
| 4,144,181 | 3/1979 | Elliott et al. | 252/33 |
| 4,160,739 | 7/1979 | Stambaugh et al. | 252/34 |
| 4,169,063 | 9/1979 | Klovsky | 252/51.5 A |
| 4,171,273 | 10/1979 | Waldbillig et al. | 252/51.5 A |
| 4,201,732 | 5/1980 | Wolinski et al. | 525/363 |
| 4,219,432 | 8/1980 | Girgenti et al. | 252/51.5 A |
| 4,320,019 | 3/1982 | Hayashi | 252/51.5 A |
| 4,516,104 | 5/1985 | McDermott | 336/206 |
| 4,517,104 | 5/1985 | Bloch et al. | 252/51.5 A |
| 4,632,769 | 12/1986 | Gutierrez et al. | 252/48.6 |
| 4,804,794 | 2/1989 | VerStrate | 585/12 |
| 4,900,461 | 2/1990 | VerStrate et al. | 252/49.6 |
| 4,933,099 | 6/1990 | Ver Strate | 585/12 |
| 4,938,885 | 7/1990 | Migdal | 252/51.5 A |
| 4,956,107 | 9/1990 | Guteirrez | 252/47 |
| 5,118,433 | 6/1992 | Chung et al. | 252/51.5 A |
| 5,167,848 | 12/1992 | Chung et al. | 252/51.5 A |
| 5,290,461 | 3/1994 | Chung et al. | 252/51.5 A |

FOREIGN PATENT DOCUMENTS

| | | |
|---|---|---|
| 2753569 | 7/1978 | Fed. Rep. of Germany . |
| 2845288 | 4/1979 | Fed. Rep. of Germany . |
| 3025274 | 1/1981 | Fed. Rep. of Germany .......... C10M 1/28 |
| 2423530 | 11/1979 | France . |
| 785496 | 9/1978 | South Africa ................. C10M 1/32 |
| 1578049 | 10/1980 | United Kingdom ........... C08F 8/32 |
| 2055852 | 3/1981 | United Kingdom ........... C08F 8/32 |

*Primary Examiner*—Jacqueline V. Howard
*Attorney, Agent, or Firm*—T. V. Kowalchyn

[57] ABSTRACT

Composition of matter useful as multifunctional viscosity index improver for lubricating oil comprising reaction product of: (i) (a) molecular weight degraded ethylene-alpha-olefin copolymer obtained by degrading copolymer of ethylene and at least one other alpha-olefin monomer, said copolymer comprising intramolecularly heterogeneous copolymer chains containing at least one crystallizable segment of methylene units and at least one low crystallinity ethylene-alpha-olefin copolymer segment, wherein said copolymer has a molecular weight distribution characterized by at least one of a ratio of $M_w/M_n$ of less than 2 and a ratio of $M_z/M_w$ of less than 1.8, and said degraded copolymer grafted with (b) ethylenically monounsaturated carboxylic acid material having 1 to 2 carboxylic acid groups or anhydride group to form grafted ethylene copolymer; (ii) about $C_{50}$ to about $C_{400}$ hydrocarbyl substituted carboxylic acid component containing 1 to 2 carboxylic acid groups or anhydride group; (iii) thioamido-amine; and (iv) $C_{12}$ to about $C_{18}$ hydrocarbyl substituted dicarboxylic anhydride.

7 Claims, No Drawings

MULTIFUNCTIONAL VISCOSITY INDEX IMPROVER DERIVED FROM AMIDO-AMINE AND DEGRADED ETHYLENE COPOLYMER EXHIBITING IMPROVED LOW TEMPERATURE VISCOMETRIC PROPERTIES

This is a division of application Ser. No. 07/848,817, filed Mar. 10, 1992, now U.S. Pat. No. 5,290,461.

FIELD OF THE INVENTION

The present invention relates to nitrogen containing grafted degraded ethylene copolymers useful as multifunctional viscosity index (V.I.) improver additives, e.g., viscosity index improvers-dispersants, for oleaginous compositions, particularly fuel oils and lubricating oils, methods for preparing said nitrogen containing grafted degraded ethylene copolymers, and to oleaginous compositions containing these nitrogen containing grafted degraded ethylene copolymers. More specifically the instant invention relates to nitrogen containing grafted degraded copolymers comprising molecular weight degraded copolymers of ethylene with other alpha-olefins, said degraded copolymers being obtained by degrading ethylene-alpha-olefin copolymers comprised of segmented copolymer chains with compositions which are intramolecularly heterogeneous and intermolecularly homogeneous, grafted with ethylenically unsaturated carboxylic acid material and reacted with amido-amine. The compositions of matter of the instant invention provide oleaginous compositions, particularly lubricating oil compositions, exhibiting improved low temperature viscometric properties compared to oleaginous compositions containing conventional nitrogen containing grafted ethylene-alpha-olefin copolymers.

BACKGROUND OF THE INVENTION n It is known that the viscosity index of an oleaginous composition such as lubricating oil can be increased or improved by incorporating therein certain polymeric materials which function as viscosity index improvers. Known viscosity index improvers include polyisobutene and copolymers of ethylene and other hydrocarbon olefins. It is also known that these viscosity index improvers can be grafted with grafting materials such as, for example, maleic anhydride and the grafted material then reacted with a polyamine or polyol to form multi-functional viscosity index improvers.

Generally, the polymeric materials useful as viscosity index improvers are those having number average molecular weights of from about 15,000 to about 250,000, preferably about 20,000 to about 150,000. However, some of such polymers having this molecular weight range are difficult to process, isolate and handle, or are relatively more expensive to produce than their higher molecular weight homologs. Therefore, with such polymers it is generally easier and more economical to form their higher molecular weight homologs, for example those having number average molecular weights of from about 30,000 to about 500,000, and then to degrade these high molecular weight polymers to the desired molecular weight.

It is known that olefin and di-olefin homopolymers and ethylene-α-olefin copolymers may be degraded, thereby reducing the molecular weight thereof. Such degradation is known to be accomplished, for example, by shear assisted oxidation of the polymers and copolymers in air in a mechanical mixer, such as in an extruder, masticator, Banbury mixer, rubber mill, or the like, and by heating the polymers and copolymers, sometimes in the presence of air. One such degradation process, which is described in U.S. Pat. No. 3,313,793, involves (a) the formation of a solution of a conjugated diene polymer, (b) combining therewith a per-oxide and a copper source such as copper, a copper halide or a copper carboxylate, (c) heating the resulting mixture in the substantial absence of oxygen, and (d) recovering a diene polymer product having a substantially reduced average molecular weight.

U.S. Pat. No. 3,332,926 relates to the thermal degradation of polyolefins, including ethylene-propylene copolymers, to produce relatively low molecular weight polymers which are useful, for example, as wax substitutes, blending agents, coating compositions and, in general, in fields where hydrocarbon resins and waxes find utility. The process described in that patent comprises mixing a crystalline starting polymer with from 0.075% to 10% by weight of a metal salt of carboxylic acid and heating the mixture in an atmosphere which is substantially free from oxygen to a temperature of about 275° C. to 450° C., until a substantial reduction in the molecular weight of the polymer takes place.

U.S. Pat. No. 3,316,177 discloses a functional fluid containing a sludge inhibiting detergent comprising the polyamine salts of the reaction product of the maleic anhydride and an oxidized interpolymer of propylene and ethylene. The interpolymers from which the oxidized, degraded interpolymers are derived usually have molecular weights of at least about 50,000. The interpolymers are oxidized and degraded by heating them at a temperature of at least about 100° C. in the presence of oxygen or air. Such degradation usually is characterized by a substantial reduction of the molecular weight of the interpolymer.

U.S. Pat. No. 3,345,352 relates to a catalytic process for the thermal degradation of the polyolefins, including copolymers of ethylene and propylene. The degradation process involves heating a mixture of a crystalline polyolefin and an oxide or carbonate of an alkali metal, alkaline earth metal, or certain selected transition metals such as copper, iron, titanium, vanadium, etc. in an atmosphere substantially free of oxygen to a temperature of from 275° C. to 450° C. for a minimum time period of at least five minutes.

U.S. Pat. No. 3,687,849 relates to lubricants containing oil-soluble graft polymers derived from degraded ethylene-propylene interpolymers. The interpolymers from which the degraded polymers are derived usually have a molecular weight of about 50,000–800,000 and the degraded interpolymers are prepared by heating the interpolymer, or a fluid solution of such interpolymer, in an inert solvent, at a temperature of at least about 140° C. in the presence of oxygen or air. The degradation of the interpolymer is characterized by a substantial reduction of its molecular weight. A similar disclosure is set forth in U.S. Pat. No. 3,687,905.

U.S. Pat. No. 3,769,216 relates to polymers which are produced by reacting a primary or secondary amine and a mechanically degraded, oxidized atactic ethylene propylene copolymer, and to automotive lubricating oils containing such polymers as antivarnish additives. The ethylene propylene copolymer is mechanically degraded in the presence of oxygen and in the absence of any solvent in a closed vessel equipped with shearing blades. A typical apparatus of this type is described as a device containing counter-rotating helical blades and known as a "Brabender Torque Rheometer."

U.S. Pat. No. 4,089,794 discloses ethylene copolymers derived from about 2 to 98 wt % ethylene, and one or more $C_3$ to $C_{28}$ α-olefins, for example ethylenepropylene, which are solution-grafted with an ethylenically unsaturated carboxylic acid material, and thereafter reacted with a polyfunctional material reactive with carboxyl groups. The resulting polymers are useful as dispersant additives for lubricating oils and hydrocarbon fuels, and as multifunctional viscosity index improvers if their molecular weight is above 10,000.

U.S. Pat. No. 4,113,636 discloses the mechanical degradation at elevated temperatures, and in the presence of air or oxygen-containing gas, of copolymers comprising about 68 to 80 mole % ethylene and one or more $C_3$–$C_8$ α-olefins to form an oxygenated-degraded polymer which is hen reacted with an amine compound. The resulting aminated polymers are useful as viscosity index improving additives.

U.S. Pat. Nos. 4,074,033 and 4,201,732 relate to a process for improving the processability for high molecular weight neoprene polymers. The process comprises treating a solution of the polymers in an organic solvent with an organic peroxide, in the presence of oxygen, to reduce the molecular weight of the neoprene and to lower the viscosity of the solution. The process may be conducted at room temperature with or without agitation, and an accelerator such as a cobalt salt or other transition metal salt may be employed.

The concept of grafting high molecular weight ethylene and α-olefin copolymers, either degraded or undegraded, with acid moieties such as maleic anhydride, followed by reaction with an amine to form a composition useful as a multifunctional viscosity index improver, e.g., viscosity index improver-dispersant, oil additive is also known and in addition to being disclosed in some of the aforediscussed patents is also disclosed, inter alia, in the following disclosures:

U.S. Pat. No. 3,316,177 teaches ethylene copolymers such as ethylene-propylene, or ethylene-propylene-diene, which are heated to elevated temperatures in the presence of oxygen so as to oxidize the polymer and cause its reaction with maleic anhydride which is present during the oxidation. The resulting polymer can then be reacted with alkylene polyamines.

U.S. Pat. No. 3,326,804 teaches reacting ethylene copolymers with oxygen or ozone, to form a hydroperoxidized polymer, which is grafted with maleic anhydride followed by reaction with polyalkylene polyamines.

U.S. Pat. No. 4,089,794 teaches grafting the ethylene copolymer with maleic anhydride using peroxide in a lubricating oil solution, wherein the grafting is preferably carried out under nitrogen, followed by reaction with polyamine.

U.S. Pat. No. 4,137,185 teaches reacting $C_1$ to $C_{30}$ mono carboxylic acid anhydrides, and dicarboxylic anhydrides, such as acetic anhydride, succinic anhydride, etc. with an ethylene copolymer reacted with maleic anhydride and a polyalkylene polyamine to inhibit cross linking and viscosity increase due to further reaction of any primary amine groups which were initially unreacted.

U.S. Pat. No. 4,144,181 is similar to U.S. Pat. No. 4,137,185 in that it teaches using a sulfonic acid to inactivate the remaining primary amine groups when a maleic anhydride grafted ethylene-propylene copolymer is reacted with a polyamine.

U.S. Pat. No. 4,169,063 reacts an ethylene copolymer in the absence of oxygen and chlorine at temperatures of 150° to 250° C. with maleic anhydride followed by reaction with polyamine.

A number of prior disclosures teach avoiding the use of polyamine having two primary amine groups to thereby reduce cross-linking problems which become more of a problem as the number of amine moieties added to the polymer molecule is increased in order to increase dispersancy.

German Published Application No. P3025274.5 teaches an ethylene copolymer reacted with maleic anhydride in oil using a long chain alkyl hetero or oxygen containing amine.

U.S. Pat. No. 4,132,661 grafts ethylene copolymer, using peroxide and/or air blowing, with maleic anhydride and then reacts with primary-tertiary diamine.

U.S. Pat. No. 4,160,739 teaches an ethylene copolymer which is grafted, using a free radical technique, with alternating maleic anhydride and a second polymerizable monomer such as methacrylic acid, which materials are reacted with an amine having a single primary, or a single secondary, amine group.

U.S. Pat. No. 4,171,273 reacts an ethylene copolymer with maleic anhydride in the presence of a free radical initiator and then with mixtures of $C_4$ to $C_{12}$ n-alcohol and amine such as N-aminopropylmorpholine or dimethylamino propyl amine to form a V.I.-dispersant-pour depressant additive.

U.S. Pat. No. 4,219,432 teaches maleic anhydride grafted ethylene copolymer reacted with a mixture of an amine having only one primary group together with a second amine having two or more primary groups.

German published application No. 2753569.9 shows an ethylene copolymer reacted with maleic anhydride by a free-radical technique and then reacted with an amine having a single primary group.

German published application No. 2845288 grafts maleic anhydride on an ethylene-propylene copolymer by thermal grafting at high temperatures and then reacts with amine having one primary group.

French published application No. 2423530 grafts maleic anhydride on an ethylene-propylene copolymer with maleic anhydride at 150° to 210° C. followed by reaction with an amine having one primary or secondary group.

The early patents such as U.S. Pat. Nos. 3,316,177 and 3,326,804 taught the general concept of grafting an ethylene-propylene copolymer with maleic anhydride and then reacting with a polyalkylene polyamine such as polyethylene amines. Subsequently, U.S. Pat. No. 4,089,794 was directed to using an oil solution for free radical peroxide grafting the ethylene copolymer with maleic anhydride and then reaction with the polyamine. This concept had the advantage that by using oil, the entire reaction could be carried out in an oil solution to form an oil concentrate, which is the commercial form in which such additives are sold. This was an advantage over using a volatile solvent for the reactions, which has to be subsequently removed and replaced by oil to form a concentrate. Subsequently, in operating at higher polyamine levels in order to further increase the dispersing effect, increased problems occurred with the unreacted amine groups cross-linking and thereby causing viscosity increase of the oil concentrate during storage and subsequent formation of haze and in some instances gelling. Even though one or more moles of the ethylene polyamine was used per mole of maleic anhydride during imide formation, cross-linking became more of a problem as the nitrogen content of the polymers was increased. One solution was to use the polyamines and then to react the remaining primary amino groups with an acid anhydride, preferably acetic anhydride, of U.S. Pat. No. 4,137,185 or the sulfonic acid of U.S. Pat. No. 4,144,181. The cross-linking problem could also be minimized by avoidance of the ethylene polyamines and instead using amines having one primary group which would react with the maleic anhydride while the other amino groups would be tertiary groups which were substantially unreactive. Patents or published applications showing the use of such primary-tertiary amines noted above are U.S. Pat. No. 4,219,432, wherein a part of the polyamine was replaced with a primary-tertiary amine; U.S. Pat. Nos. 4,132,661; 4,160,739; 4,171,273; German No. P2753569.9; German No. 2,845,288; and French No. 2,423,530.

U.S. Pat. Nos. 4,516,104 and 4,632,769 represented a further improvement over the art in that they permitted the utilization of the generally less expensive polyamines having two primary amine groups, while achieving good dispersancy levels, inhibiting cross-linking and allowing initiator, e.g., peroxide, grafting in oil.

U.S. Pat. No. 4,517,104 discloses polymeric viscosity index (V.I.) improver-dispersant additives for petroleum oils, particularly lubricating oils, comprising a copolymer of ethylene with one or more $C_3$ to $C_{28}$ α-olefins, preferably propylene, which have been grafted with acid moieties, e.g., maleic anhydride, preferably using a free radical initiator in a solvent, preferably lubricating oil, and then reacted with a mixture of a carboxylic acid component, preferably an alkyl succinic anhydride, and a polyamine having two or more primary amine groups. Or the grafted polymer may be reacted with said acid component prereacted with said polyamine to form salts, amides, imides, etc. and then reacted with said grafted olefin polymer. These reactions can permit the incorporation of varnish inhibition and dispersancy into the ethylene copolymer while inhibiting cross-linking or gelling.

U.S. Pat. No. 4,632,769 discloses oil soluble viscosity improving ethylene copolymers such as copolymers of ethylene and propylene, reacted or grafted with ethylenically unsaturated carboxylic acid moieties, preferably maleic anhydride moieties, and then reacted with polyamines having two or more primary amine groups and a $C_{22}$ to $C_{28}$ olefin carboxylic acid component, preferably alkylene polyamine and alkenyl succinic anhydride, respectively. These reactions can permit the incorporation of varnish inhibition and dispersancy into the ethylene copolymer while inhibiting cross-linking or gelling.

There is, however, a need to provide multi-functional viscosity index (V.I.) improver additives which when added to oleaginous compositions such as lubricating oil compositions provide oil compositions which exhibit improved or better low temperature viscometric properties.

The problem of providing V.I. improving oil additives capable of providing oleaginous compositions exhibiting improved low temperature viscometric properties is addressed in U.S. Pat. No. 4,804,794 which discloses segmented copolymers of ethylene and at least one other α-olefin monomer, each copolymer being intramolecularly heterogeneous and intermolecularly homogeneous and at least one segment of the copolymer, constituting at least 10% of the copolymer's chain, being a crystallizable segment. These copolymers are disclosed as exhibiting good mechanical properties such as good shear stability and as being useful V.I. improvers which provide lubricating oils having highly desirable viscosity and pumpability properties at low temperatures. However, these copolymers are disclosed as being V.I. improvers, and there is no disclosure of grafting said copolymers with an ethylenically unsaturated grafting material or of grafting said copolymers and then reacting the grafted copolymer with a polyamine or polyol to produce a composition useful as a multifunctional viscosity index improver for oleaginous composition. Nor is there any disclosure in this patent of degrading these copolymers to reduce their molecular weight. It was heretofore generally believed that degrading these copolymers to obtain copolymers of lower molecular weight would generally adversely affect, i.e., broaden, their narrow molecular weight distribution and affect their intramolecular heterogeneity and intermolecular homogeneity. This, it was believed, would have a concomitant deleterious affect upon their ability to provide oil compositions exhibiting improved low temperature viscometric properties. It was further generally believed that these ethylene copolymers could not be grafted with conventional ethylenically unsaturated grafting materials or grafted with said grafting materials and thereafter reacted with a polyamine to form a multifunctional viscosity index improver without deleteriously or adversely affecting, i.e., broadening, their narrow molecular weight distribution (MWD) and affecting their intermolecular homogeneity and intramolecular homogeneity, thereby deleteriously and adversely affecting their property of providing oil compositions exhibiting improved low temperature viscometric properties. Indeed, degrading these copolymers to reduce their molecular weights broadens their narrow molecular weight distribution and affects their intramolecular heterogeneity and intermolecular homogeneity. However, it has surprisingly and unexpectedly been discovered that these degraded copolymers grafted with a grafting material such as carboxylic acid or anhydride and thereafter reacted with an amido-amine or thioamido-amine when added to oleaginous compositions provide oleaginous compositions exhibiting better low temperature viscometric properties than oleaginous compositions containing conventional non-narrow MWD ethylene-α-olefin copolymers, either degraded or undegraded, grafted with grafting materials such as carboxylic acid or anhydride and thereafter reacted with an amido-amine or thioamido-amine.

SUMMARY OF THE INVENTION

The present invention is directed to oil soluble nitrogen containing grafted degraded ethylene copolymers useful as multifunctional viscosity index improvers or modifiers, e.g., as V.I. improver-dispersant additives, oleaginous compositions. The nitrogen containing grafted degraded ethylene copolymers of the instant invention provide oleaginous compositions, in particular lubricating oil compositions, exhibiting improved viscometric properties, particularly highly desirable viscosity properties at low temperatures, and dispersancy characteristics.

The degraded in molecular weight ethylene copolymers of the instant invention are grafted with an ethylenically unsaturated, preferably monounsaturated carboxylic acid grafting material and the grafted degraded ethylene copolymers are then reacted with at least one amido-amine or thioamido-amine.

The amido-amine is characterized by being a reaction product of at least one amine and an $\alpha$-, $\beta$-unsaturated compound of the formula

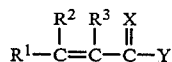

wherein X is sulfur or oxygen, Y is $-OR^4$, $-SR^4$, or $-NR^4(R^5)$, and $R^1$, $R^2$, $R^3$, $R^4$ and $R^5$ are the same or different and are hydrogen or substituted or unsubstituted hydrocarbyl.

The undegraded ethylene copolymers which are degraded with the present grafted and reacted with the amido-amine in accordance are disclosed in U.S. Pat. No. 4,804,794, which is incorporated herein by reference. These undegraded copolymers are segmented copolymers of ethylene and at least one other alpha-olefin monomer; each copolymer is intramolecularly heterogeneous and intermolecularly homogeneous and at least one segment of the copolymer, constituting at least 10% of the copolymer's chain, is a crystallizable segment. For the purposes of this application, the term "crystallizable segment" is defined to be each segment of the copolymer chain having a number-average molecular weight of at least 700 wherein the ethylene content is at least 57 wt. %. The remaining segments of the copolymer chain are herein termed the "low crystallinity segments" and are characterized by an average ethylene content of not greater than about 53 wt %. Furthermore, the molecular weight distribution (MWD) of copolymer is very narrow. It is well known that the breadth of the molecular weight distribution can be characterized by the ratios of various molecular weight averages. For example, an indication of a narrow MWD in accordance with the present invention is that the ratio of weight to number-average molecular weight ($\overline{M}_w/\overline{M}_n$) is less than 2. Alternatively, a ratio of the z-average molecular weight to the weight-average molecular weight ($\overline{M}_z/\overline{M}_w$) of less than 1.8 typifies a narrow MWD in accordance with the present invention. It is known that a portion of the property advantages of copolymers in accordance with the present invention are related to these ratios. Small weight fractions of material can disproportionately influence these ratios while not significantly altering the property advantages which depend on them. For instance, the presence of a small weight fraction (e.g. 2%) of low molecular weight copolymer can depress $\overline{M}_n$, and thereby raise $\overline{M}_w/\overline{M}_n$ above 2 while maintaining $\overline{M}_z/\overline{M}_w$ less than 1.8. Therefore, the copolymer reactants, in accordance with the present invention, are characterized by having at least one of $\overline{M}_w/\overline{M}_n$ less than 2 and $\overline{M}_z/\overline{M}_w$ less than 1.8. The copolymer reactant comprises chains within which the ratio of the monomers varies along the chain length. To obtain the intramolecular compositional heterogeneity and narrow MWD, the ethylene copolymer reactants are preferably made in a tubular reactor.

DETAILED DESCRIPTION OF THE INVENTION

In accordance with the instant invention there are provided nitrogen containing polymeric materials useful as multifunctional viscosity index improvers, particularly viscosity index improver-dispersant additives, for oleaginous materials, particularly lubricating oils, which are comprised of certain specific types of degraded ethylene and alpha-olefin copolymers grafted with ethylenically monounsaturated carboxylic acid material to forth grafted degraded ethylene copolymer, and said grafted degraded ethylene copolymers are reacted with amido-amine or thioamido-amine.

More particularly, in one aspect of the instant invention, hereinafter referred to as Aspect A, these polymeric materials are comprised of the reaction products of:

(i) molecular weight degraded copolymer obtained by degrading copolymer of ethylene and at least one other alpha-olefin monomer, said copolymer comprising intramolecularly heterogeneous and intermolecularly homogeneous copolymer chains containing at least one crystallizable segment of methylene units and at least one low crystallinity ethylene-alpha-olefin copolymer segment, wherein said at least one crystallizable segment comprises at least about 10 weight percent of said copolymer chain and contains at least about 57 weight percent ethylene, wherein said low crystallinity segment contains not greater than about 53 weight percent ethylene, and wherein said copolymer has a molecular weight distribution characterized by at least one of a ratio of $\overline{M}_w/\overline{M}_n$ of less than 2 and a ratio of $\overline{M}_z/\overline{M}_w$ of less than 1.8, and wherein at least two portions of an individual intramolecularly heterogeneous chain, each portion comprising at least 5 weight percent of said chain, differ in composition from one another by at least 7 weight percent ethylene; said degraded copolymer grafted with ethylenically monounsaturated carboxylic acid material; and (ii) amido-amine.

In another aspect of the instant invention, hereinafter referred to as Aspect B, the nitrogen containing grafted degraded ethylene copolymers are comprised of the reaction products of:

(i) molecular weight degraded copolymer obtained by degrading copolymer of ethylene and at least one other alpha-olefin monomer, said copolymer comprising intramolecularly heterogeneous and intermolecularly homogeneous copolymer chains containing at least one crystallizable segment of methylene units and at least one low crystallinity ethylene-alpha-olefin copolymer segment, wherein said at least one crystallizable segment comprises at least about 10 weight percent of said copolymer chain and contains at least about 57 weight percent ethylene, wherein said low crystallinity segment contains not greater than about 53 weight percent ethylene, and wherein said copolymer has a molecular weight distribution characterized by at least one of a ratio of $\overline{M}_w/\overline{M}_n$ of less than 2 and a ratio of $\overline{M}_z/\overline{M}_w$ of less than 1.8, and wherein at least two portions of an individual intramolecularly heterogeneous chain, each portion comprising at least 5 weight percent of said chain, differ incomposition from one another by at least 7 weight percent ethylene; said degraded copolymer grafted with ethylenically monounsaturated carboxylic acid material;

(ii) carboxylic acid component comprising $C_{12}$–$C_{49}$ hydrocarbyl substituted dicarboxylic acid or anhydride, $C_{50}$–$C_{400}$ hydrocarbyl substituted monocarboxylic acid, or $C_{50}$–$C_{400}$ hydrocarbyl substituted dicarboxylic acid, or anhydride; and (iii) amido-amine.

In yet a further aspect of the instant invention the nitrogen containing carboxylic acid material grafted degraded ethylene copolymers of either aspect A or B are reacted or post-treated with a viscosity stabilizing or end-capping agent such as, for example, a $C_{12}$–$C_{18}$ hydrocarbyl substituted dicarboxylic anhydride.

When the nitrogen containing grafted degraded ethylene copolymers of the instant invention are incorporated into oleaginous materials such as lubricating oils the resultant oleaginous compositions exhibit better low temperature viscometric properties than oleaginous compositions containing conventional nitrogen containing grafted ethylene copolymers. Furthermore, the nitrogen containing grafted degraded ethylene copolymers of this invention function as dispersants in oleaginous compositions and generally exhibit substantially similar or better dispersancy efficacy as conventional nitrogen containing grafted ethylene copolymers falling outside the scope of the instant invention.

ETHYLENE AND ALPHA-OLEFIN COPOLYMER

The ethylene and alpha-olefin copolymers which are degraded to form the degraded ethylene-α-olefin copolymers which are grafted and then reacted with the amido-amine or amine to form the compositions of matter of the instant invention are copolymers of ethylene with at least one other alpha-olefin comprised of segmented copolymer chains with compositions which are intramolecularly heterogeneous and intermolecularly homogeneous. These copolymers are described in U.S. Pat. No. 4,804,794, incorporated by reference.

For convenience, certain terms that are repeated throughout the present specification are defined below:

a. Inter-CD defines the compositional variation, in terms of ethylene content, among polymer chains. It is expressed as the minimum deviation (analogous to a standard deviation) in terms of weight percent ethylene, from the average ethylene composition for a given copolymer sample needed to include a given weight percent of the total copolymer sample, which is obtained by excluding equal weight fractions from both ends of the distribution. The deviation need not be symmetrical. When expressed as a single number, for example 15% Inter-CD, it shall mean the larger of the positive or negative deviations. For example, for a Gaussian compositional distribution, 95.5% of the polymer is within 20 wt. % ethylene of the mean if the standard deviation is 10%. The Inter-CD for 95.5 wt. % of the polymer is 20 wt. % ethylene for such a sample.

b. Intra-CD is the compositional variation, in terms of ethylene, within a copolymer chain. It is expressed as the minimum difference in weight (wt. %) ethylene that exists between two portions of a single copolymer chain, each portion comprising at least 5 weight % of the chain.

c. Molecular weight distribution (MWD) is a measure of the range of molecular weights within a given copolymer sample. It is characterized in terms of at least one of the ratios of weight-average to number-average molecular weight, $\overline{M}_w/\overline{M}_n$, and z-average to weight-average molecular weight, $\overline{M}_z/\overline{M}_w$, where:

$$M_w = \frac{\Sigma N_i M_i^2}{\Sigma N_i M_i}$$

$$M_n = \frac{\Sigma N_i M_i}{\Sigma N_i}, \text{ and}$$

$$M_z = \frac{\Sigma N_i M_i^3}{\Sigma N_i M_i^2}$$

wherein $N_i$ is the number of molecules of molecular weight $M_i$.

d. Viscosity Index (V.I.) is the ability of a lubricating oil to accommodate increases in temperature with a minimum decrease in viscosity. The greater this ability, the higher the V.I. Viscosity Index is determined according to ASTM D2270.

The instant copolymers are segmented copolymers of ethylene and at least one other alpha-olefin monomer wherein the copolymers chain contains at least one crystallizable segment of ethylene monomer units, as will be more completely described below, and at least one low crystallinity ethylene-alpha-olefin copolymer segment, where in the low crystallinity copolymer segment is characterized in the unoriented bulk state after at least 24 hours annealing by a degree of crystallinity of less than about 0.2% at 23° C., and wherein the copolymer's chain is intramolecularly heterogeneous and intermolecularly homogeneous, and has an MWD characterized by at least one of $\overline{M}_w/\overline{M}_n$ of less than 2 and $\overline{M}_z/\overline{M}_w$ of less than 1.8. The crystallizable segments comprise from about 10 to 90 wt. %, preferably from about 20 to 85 wt. %, of the total copolymer chain, and contain an average ethylene content which is at least about 57 wt. %, preferably at least about 62 wt. %, and more preferably at least about 63 wt. % and which is not greater than 95 wt. %, more preferably <85%, and most preferably <75 wt. % (e.g., from about 58 to 68 wt. %). The low crystallinity copolymer segments comprise from about 90 to 10 wt. %, preferably from about 80 to 15 wt. %, and more preferably from about 65 to 35 wt. %, of the total copolymer chain, and contain an average ethylene content of from about 20 to 53 wt. %, preferably from about 30 to 50 wt. %, and more preferably from about 35 to 50 wt. %. The copolymers comprise intramolecularly heterogeneous chain segments wherein at least two portions of an individual intramolecularly heterogeneous chain, each portion comprising at least 5 weight percent of the chain and having a molecular weight of at least 7000 contain at least 5 wt. % ethylene and differ in composition from one another by at least 5 weight percent ethylene, wherein the intermolecular compositional dispersity of the polymer is such that 95 wt. % of the polymer chains have a composition 15% or less different in ethylene from the average weight percent ethylene composition, and wherein the copolymer is characterized by at least one or a ratio of $\overline{M}_w/\overline{M}_n$ of less than 2 and a ratio of $\overline{M}_z/\overline{M}_w$ of less than 1.8.

As described above, the copolymers will contain at least one crystallizable segment rich in methylene units (hereinafter called an "M" segment) and at least one low crystallinity ethylene-alpha-olefin copolymer segment (hereinafter called a "T" segment). The copolymers may be therefore illustrated by copolymers selected from the group consisting of copolymer chain structures having the following segment sequences:

M—T,                         (I)

$T^1$—(M—$T^2$)x, and            (II)

$$T^1-(M^1-T^2)_y-M^2 \qquad (III)$$

wherein M and T are defined above, $M^1$ and $M^2$ can be the same or different and are each M segments, $T^1$ and $T^2$ can be the same or different and are each T segments, x is an integer of from 1 to 3 and y is an integer of 1 to 3.

In structure II (x=1), the copolymer's M segment is positioned between two T segments, and the M segment can be positioned substantially in the center of the polymer chain (that is, the $T^1$ and $T^2$ segments can be substantially the same molecular weight and the sum of the molecular weight of the $T^1$ and $T^2$ segments can be substantially equal to the molecular weight of the M segment), although this is not essential to the practice of this invention. Preferably, the copolymer will contain only one M segment per chain. Therefore, structures I and II (x=1) are preferred.

Preferably, the M segments and T segments of the copolymer are located along the copolymer chain so that only a limited number of the copolymer chains can associate before the steric problems associated with packing the low crystallinity T segments prevents further agglomeration. Therefore, in a preferred embodiment, the M segment is located near the center of the copolymer chain and only one M segment is in the chain.

As will be shown below, a copolymer of the structure $$M^1-(T-M^2)_z \qquad (IV)$$

(wherein $M^1$, $M^2$ and T are as defined above, and wherein z is an integer of at least 1) are undesirable as viscosity modifier polymers. It has been found that solutions of structure IV copolymers in oil tend to gel even when the M and T portions have exactly the same composition and molecular weight as structure II copolymers (with x=z=1). It is believed this poor viscosity modifier performance is due to the inability of a center T segment to sterically stabilize against association.

The M segments of the copolymers of this invention comprise ethylene and can also comprise at least one other alpha-olefin, e.g., containing 3 to 18 carbon atoms. The T segments comprise ethylene and at least one other alpha-olefin, e.g., alpha-olefins containing 3 to 18 carbon atoms. The M and T segments can also comprise other polymerizable monomers, e.g., non-conjugated dienes or cyclic mono-olefins.

Since the present invention is considered to be most preferred in the context of ethylene-propylene (EPM) copolymers it will be described in detail in the context of EPM.

Copolymer (i)(a) in accordance with the present invention is preferably made in a tubular reactor. When produced in a tubular reactor with monomer feed only at the tube inlet, it is known at the beginning of the tubular reactor, ethylene, due to its high reactivity, will be preferentially polymerized. The concentration of monomers in solution changes along the tube in favor of propylene as the ethylene is depleted. The result, with monomer feed only at the inlet, is copolymer chains which are higher in ethylene concentration in the chain segments grown near the reactor inlet (as defined at the point at which the polymerization reaction commences), and higher in propylene concentration in the chain segments formed near the reactor outlet. These copolymer chains are therefore tapered in composition. An illustrative copolymer chain of ethylene-propylene is schematically presented below with E representing ethylene constituents and P representing propylene constituents in the chain:

Segment: E—E—E—E—P—E—E—E—P—P—E—E—P—P—P—E—P—P—P—P
          1                  2                  3                  4

As can be seen from this illustrative schematic chain, the far left-hand segment (1) thereof represents that portion of the chain formed at the reactor inlet where the reaction mixture is proportionately richer in the more reactive constituent ethylene. This segment comprises four ethylene molecules and one propylene molecule. However, as subsequent segments are formed from left to right with the more reactive ethylene being depleted and the reaction mixture proportionately increasing in propylene concentration, the subsequent chain segments become more concentrated in propylene. The resulting chain is intramolecularly heterogeneous.

The property, of the copolymer discussed herein, related to intramolecular compositional dispersity (compositional variation within a chain) shall be referred to as Intra-CD, and that related to intermolecular compositional dispersity (compositional variation between chains) shall be referred to as Inter-CD.

For copolymers in accordance with the present invention, composition can vary between chains as well as along the length of the chain. An object of this invention is to minimize the amount of inter-chain variation. The Inter-CD can be characterized by the difference in composition between the copolymer fractions containing the highest and lowest quantity of ethylene. Techniques for measuring the breadth of the Inter-CD are known as illustrated in "Polymerization of ethylene and propylene to amorphous copolymers with catalysts of vanadium oxychloride and alkyl aluminum halides"; E. Junghanns, A. Gumboldt and G. Bier; Makromol. Chem., V. 58 (Dec. 12, 1962): 18–42, wherein a p-xylene/dimethylformamide solvent/non-solvent was used to fractionate copolymer into fractions of differing intermolecular composition. Other solvent/non-solvent systems can be used as hexane/2 propanol, as will be discussed in more detail below.

The Inter-CD of copolymer in accordance with the present invention is such that 95 wt. % of the copolymer chains have an ethylene composition that differs from the average weight percent ethylene composition by 15 wt. % or less. The preferred Inter-CD is about 13% or less, with the most preferred being about 10% or less. In comparison, Junghanns et al. found that their tubular reactor copolymer had an Inter-CD of greater than 15 wt. %.

Broadly, the Intra-CD of copolymer in accordance with the present invention is such that at least two portions of an individual intramolecularly heterogeneous chain, each portion comprising at least 5 weight percent of the chain, differ in composition from one another by at least 7 weight percent ethylene. Unless otherwise indicated, this property of Intra-CD as referred to herein is based upon at least two 5 weight percent portions of copolymer chain. The Intra-CD of copolymer in accordance with the present invention can be such that at least two portions of copolymer chain differ by at least 10 weight percent ethylene. Differences of at least 20 weight percent, as well as, of at least 40 weight percent ethylene are also considered to be in accordance with the present invention.

The experimental procedure for determining Intra-CD is as follows. First the Inter-CD is established as described below, then the polymer chain is broken into fragments along its contour and the Inter-CD of the fragments is determined. The difference in the two results is due to Intra-CD as can be seen in the illustrative example below.

Consider a heterogeneous sample polymer containing 30 monomer units. It consists of 3 molecules designated A, B, C.
A: EEEEPEEEPEEEPPEEPPEPPPEPPPPPPP
B: EEEEEPEEEPEEEPPEEEPPPEPPPEEPPP
C: EEPEEEPEEEPEEEPEEEPPEEPPPEEPPP Molecule A is 36.8 wt. % ethylene, B is 46.6%, and C is 50% ethylene. The average ethylene content for the mixture is 44.3%. For this sample the Inter-CD is such that the highest ethylene polymer contains 5.7% more ethylene than the average while the lowest ethylene content polymer contains 7.5% less ethylene than the average. Or, in other words, 100 weight % of the polymer is within +5.7% and −7.5% ethylene about an average of 44.3%. Accordingly, the Inter-CD is 7.5% when the given weight % of the polymer is 100%.

If the chains are broken into fragments, there will be a new Inter-CD. For simplicity, consider first breaking only molecule A into fragments shown by the slashes as follows:
EEEEP/EEEPE/EEPPE/EPPPEP/PPEPP/PPPPP
Portions of 72.7%, 72.7%, 50%, 30.8%, 14.3% and 0% ethylene are obtained. If molecules B and C are similarly broken and the weight fractions of similar composition are grouped a new Inter-CD is obtained.

In order to determine the fraction of a polymer which is intramolecularly heterogeneous in a mixture of polymers combined from several sources the mixture must be separated into fractions which show no further heterogenity upon subsequent fractionation. These fractions are subsequently fractured and fractionated to reveal which are heterogeneous.

The fragments into which the original polymer is broken should be large enough to avoid end effects and to give a reasonable opportunity for the normal statistical distribution of segments to form over a given monomer conversion range in the polymerization. Intervals of ca 5 weight % of the polymer are convenient. For example, at an average polymer molecular weight of about 105, fragments of ca 5000 molecular weight are appropriate. A detailed mathematical analysis of plug flow or batch polymerization indicates that the rate of change of composition along the polymer chain contour will be most severe at high ethylene conversion near the end of the polymerization. The shortest fragments are needed here to show the low ethylene content sections.

The best available technique for determination of compositional dispersity for non-polar polymers is solvent/non-solvent fractionation which is based on the thermodynamics of phase separation. This technique is described in "Polymer Fractionation", M. Cantow editor, Academic 1967, p. 341 and in H. Inagaki, T. Tanaku, *Developments in Polymer Characterization*, 3, 1, (1982). These are incorporated herein by reference.

For non-crystalline copolymers of ethylene and propylene, molecular weight governs insolubility more than does composition in a solvent/non-solvent solution. High molecular weight polymer is less soluble in a given solvent mix. Also, there is a systematic correlation of molecular weight with ethylene content for the polymers described herein. Since ethylene polymerizes much more rapidly than propylene, high ethylene polymer also tends to be high in molecular weight. Additionally, chains rich in ethylene tend to be less soluble in hydrocarbon/polar non-solvent mixtures than propylene-rich chains. Furthermore, for crystalline segments, solubility is significantly reduced. Thus, the high molecular weight, high ethylene chains are easily separated on the basis of thermodynamics.

A fractionation procedure is as follows: Unfragmented polymer is dissolved in n-hexane at 23° C. to form ca a 1% solution (1 g. polymer/100 cc hexane). Isopropyl alcohol is titrated into the solution until turbidity appears at which time the precipitate is allowed to settle. The supernatant liquid is removed and the precipitate is dried by pressing between Mylar polyethylene terphthalate) film at 150° C. Ethylene content is determined by ASTM method D-3900. Titration is resumed and subsequent fractions are recovered and analyzed until 100% of the polymer is collected. The titrations are ideally controlled to produce fractions of 5-10% by weight of the original polymer, especially at the extremes of composition.

To demonstrate the breadth of the distribution, the data are plotted as % ethylene versus the cumulative weight of polymer as defined by the sum of half the weight % of the fraction of that composition plus the total weight % of the previously collected fractions.

Another portion of the original polymer is broken into fragments. A suitable method for doing this is by thermal degradation according to the following procedure: In a sealed container in a nitrogen-purged oven, a 2 mm thick layer of the polymer is heated for 60 minutes at 330° C. (The time or temperature can be empirically adjusted based on the ethylene content and molecular weight of the polymer.) This should be adequate to reduce a 105 molecular weight polymer to fragments of ca 5000 molecular weight. Such degradation does not substantially change the average ethylene content of the polymer, although propylene tends to be lost on scission in preference to ethylene. This polymer is fractionated by the same procedure as the high molecular weight precursor. Ethylene content is measured, as well as molecular weight on selected fractions.

The procedure to characterize intramolecular heterogeneity is laborious and even when performed at an absolute optimum, does not show how the segments of the chain are connected. In fact it is not possible, with current technology, to determine the polymer structure without recourse to the synthesis conditions. With knowledge of the synthesis conditions, the structure can be defined as follows.

Ethylene, propylene or high alpha-olefin polymerizations with transition metal catalysts can be described by the terminal copolymerization model, to an approximation adequate for the present purpose. (G. Ver Strate, *Encyclopedia of Polymer Science and Engineering*, vol. 6, 522 (1986). In this model, the relative reactivity of the two monomers is specified by two reactivity ratios defined as follows:

$$R_1 = \frac{\text{(rate constant for ethylene adding to ethylene)}}{\text{(rate constant for propylene adding to ethylene)}}$$

$$R_2 = \frac{\text{(rate constant for propylene adding to propylene)}}{\text{(rate constant for ethylene adding to propylene)}}$$

Given these two constants, at a given temperature, the ratio of the molar amount of ethylene, E, to the molar amount of propylene, P, entering the chain from a solution containing ethylene and propylene at molar concentrations [E] and [P] respectively is $$\frac{E}{P} = \frac{[E]}{[P]} \cdot \frac{(R_1[E] + [P])}{([E] + R_2[P])} \quad (1)$$

The relation of E and P to the weight % ethylene in the polymer is as follows $$\text{weight \% ethylene} = \frac{E}{E + 1.5 P} \cdot 100$$

The values of $R_1$ and $R_2$ are dependent on the particular comonomer and catalyst employed to prepare the polymer, the polymerization temperature and, to some extent, the solvent.

For all transition metal catalysts specified herein, $R_1$ is significantly larger than $R_2$. Thus, as can be seen from equation (1), ethylene will be consumed more rapidly than propylene for a given fraction of the monomer in the reacting medium. Thus, the ratio of [E]/[P] will decrease as the monomers are consumed. Only if $R_1 = R_2$ will the composition in the polymer equal that in the reacting medium.

If the amount of monomer that has reacted at a given time in a batch reactor or at a given point in a tubular reactor can be determined, it is possible through equation (1), to determine the instantaneous composition being formed at a given point along the polymer chain. Demonstration of narrow MWD and increasing MW along the tube proves the compositional distribution is intramolecular. The amount of polymer formed can be determined in either of two ways. Samples of the polymerizing solution may be collected, with appropriate quenching to terminate the reaction at various points along the reactor, and the amount of polymer formed evaluated. Alternatively, if the polymerization is run adiabatically and the heat of polymerization is known, the amount of monomer converted may be calculated from the reactor temperature profile.

Finally, if the average composition of the polymer is measured at a series of locations along the tube, or at various times in the batch polymerization case, it is possible to calculate the instantaneous composition of the polymer being made. This technique does not require knowledge of $R_1$ and $R_2$ or the heat of polymerization, but it does require access to the polymer synthesis step.

All of these methods have been employed with consistent results.

For the purpose of this patent, $R_1$ and $R_2$ thus simply serve to characterize the polymer composition in terms of the polymerization conditions. By defining $R_1$ and $R_2$, we are able to specify the intramolecular compositional distribution. In the examples shown below where $VCl_4$ and ethylaluminum sesquichloride are employed in hexane as solvent, $R_1 = 1.8 \exp(+500/RT_k)$ and $R_2 = 3.2 \exp(-1500/RT_k)$. Where "R" is the gas constant (1.98 cal/deg-mole) and "$T_k$" is degrees Kelvin. For reference, at 20° C. $R_1 = 9.7$, $R_2 = 0.02$.

The $R_1$ and $R_2$ given above predict the correct final average polymer composition. If the $R_1$ and $R_2$ and expression (2) are someday proven to be inaccurate the polymer intramolecular compositional distribution will remain as defined herein in terms of the polymerization conditions but may have to be modified on the absolute composition scales. There is little likelihood that they are in error by more than a few percent, however.

Ethylene content is measured by ASTM-D3900 for ethylene-propylene copolymers between 35 and 85 wt. % ethylene. Above 85% ASTM-D2238 can be used to obtain methyl group concentrations which are related to percent ethylene in an unambiguous manner for ethylene-propylene copolymers. When comonomers other than propylene are employed no ASTM tests covering a wide range of ethylene contents are available; however, proton and carbon-13 nuclear magnetic resonance spectroscopy can be employed to determine the composition of such polymers. These are absolute techniques requiring no calibration when operated such that all nucleii of a given element contribute equally to the spectra. For ranges not covered by the ASTM tests for ethylene-propylene copolymers, these nuclear magnetic resonance methods can also be used.

Molecular weight and molecular weight distribution are measured using a Waters 150C gel permeation chromatography equipped with a Chromatix KMX-6 (LDC-Milton Roy, Riviera Beach, Fla.) on-line light scattering photometer. The system is used at 135° C. with 1,2,4 trichlorobenzene as mobile phase. Showdex (Showa-Denko America, Inc.) polystyrene gel columns 802, 803, 804 and 805 are used. This technique is discussed in "Liquid Chromatography of Polymers and Related Materials III", J. Cazes editor. Marcel Dekker, 1981, p. 207 (incorporated herein by reference). No corrections for column spreading are employed; however, data on generally accepted standards, e.g., National Bureau of Standards Polyethene 1484 and anionically produced hydrogenated polyisoprenes (an alternating ethylene-propylene copolymer) demonstrate that such corrections on $\overline{M}_w/\overline{M}_n$ or $\overline{M}_z/\overline{M}_w$ are less than 0.05 unit. $\overline{M}_w/\overline{M}_n$ is calculated from an elution time-molecular weight relationship whereas $\overline{M}_z/\overline{M}_w$ is evaluated using the light scattering photometer. The numerical analyses can be performed using the commercially available computer software GPC2, MOLWT2 available from LDC/Milton Roy-Riviera Beach, Fla.

As already noted, copolymers in accordance with the present invention are comprised of ethylene and at least one other alpha-olefin. It is believed that such alpha-olefins could include those containing 3 to 18 carbon atoms, e.g., propylene, butene-1, pentene-1, etc. Alpha-olefins of 3 to 6 carbons are preferred due to economic considerations. The most preferred copolymers in accordance with the present invention are those comprised of ethylene and propylene.

As is well known to those skilled in the art, copolymers of ethylene and higher alpha-olefins such as propylene often include other polymerizable monomers. Typical of these other monomers may be non-conjugated dienes such as the following non-limiting examples:

a. straight chain acyclic dienes such as: 1,4-hexadiene; 1,6-octadiene;

b. branched chain acyclic dienes such as: 5-methyl-1, 4-hexadiene; 3, 7-dimethyl-1,6-octadiene; 3,7-dimethyl- 1,7-octadiene and the mixed isomers of dihydro-myrcene and dihydroocinene;

c. single ring alicyclic dienes such as: 1,4-cyclohexadiene; 1,5-cyclooctadiene; and 1,5-cyclododecadiene;

d. multi-ring alicyclic fused and bridged ring dienes such as: tetrahydroindene; methyltetrahydroindene; dicyclopentadiene; bicyclo-(2,2,1)-hepta-2, 5-diene; alkenyl, alkylidene, cycloalkenyl and cycloalkylidene norbornenes such as 5-methylene-2-norbornene (MNB), 5-ethylidene-2-norbornene (ENB), 5-propylene-2-norbornene, 5-isopropylidene-2-norbornene, 5-(4-cyclopentenyl)-2-norbornene; 5-cyclohexylidene-2-norbornene.

Of the non-conjugated dienes typically used to prepare these copolymers, dienes containing at least one of the double bonds in a strained ring are preferred. The most preferred diene is 5-ethylidene-2-norbornene (ENB). The amount of diene (wt. basis) in the copolymer could be from about 0% to 20% with 0% to 15% being preferred. The most preferred range is 0% to 10%.

As already noted, the most preferred copolymer in accordance with the present invention is ethylene-propylene. The average ethylene content of the copolymer could be as low as about 20% on a weight basis. The preferred minimum is about 25%. A more preferred minimum is about 30%. The maximum ethylene content could be about 90% on a weight basis. The preferred maximum is about 85%, with the most preferred being about 80%. Preferably, the copolymers of this invention intended for use as viscosity modifier-dispersant contain from about 35 to 75 wt. % ethylene, and more preferably from about 50 to 70 wt. % ethylene.

The molecular weight of copolymer made in accordance with the present invention can vary over a wide range. It is believed that the number-average molecular weight could be as low as about 2,000. The preferred minimum is about 10,000. The most preferred minimum is about 20,000. It is believed that the maximum number-average molecular weight could be as high as about 12,000,000. The preferred maximum is about 1,000,000. The more preferred maximum is about 750,000. The most preferred maximum is about 500,000. An especially preferred range of number-average molecular weight for copolymers intended to be degraded in accordance with the present invention to form multifunctional viscosity index improver additives is from about 50,000 to about 500,000.

The copolymers of this invention will also be generally characterized by a Mooney viscosity (i.e., ML(1,+4,) 125° C.) of from about I to 100, preferably from about 5 to 70, and more preferably from about 8 to 65, and by a thickening efficiency ("T.E.") of from about 0.4 to 5.0, preferably from about 1.0 to 4.2, most preferably from about 1.4 to 3.9.

Another feature of copolymer of the present invention is that the molecular weight distribution (MWD) is very narrow, as characterized by at least one of a ratio of $\overline{M}_w/\overline{M}_n$ of less than 2 and a ratio of $\overline{M}_z/\overline{M}_w$ of less than 1.8. As relates to EPM and EPDM, a typical advantage of such copolymers having narrow MWD is resistance to shear degradation. Particularly for oil additive applications, the preferred copolymers have $\overline{M}_w/\overline{M}_n$ less than about 1.5, with less than about 1.25 being most preferred. The preferred $\overline{M}_z/\overline{M}_w$ is less than about 1.5, with less than about 1.2 being most preferred.

The copolymers of the instant invention may be produced by polymerization of a reaction mixture comprised of catalyst, ethylene and at least one additional alpha-olefin monomer, wherein the amounts of monomer, and preferably ethylene, is varied during the course of the polymerization in a controlled manner as will be hereinafter described. Solution polymerizations are preferred.

Any known solvent for the reaction mixture that is effective for the purpose can be used in conducting solution polymerizations in accordance with the present invention. For example, suitable solvents would be hydrocarbon solvents such as aliphatic, cycloaliphatic and aromatic hydrocarbon solvents, or halogenated versions of such solvents. The preferred solvents are $C_{12}$ or lower, straight chain or branched chain, saturated hydrocarbons, $C_5$ to $C_9$ saturated alicyclic or aromatic hydrocarbons or $C_2$ to $C_6$ halogenated hydrocarbons. Most preferred are $C_{12}$ or lower, straight chain or branched chain hydrocarbons, particularly hexane. Non-limiting illustrative examples of solvents are butane, pentane, hexane, heptane, cyclopentane, cyclohexane, cycloheptane, methyl cyclopentane, methyl cyclohexane, isooctane, benzene, toluene, xylene, chloroform, chlorobenzenes, tetrachloroethylene, dichloroethane and trichloroethane.

These polymerizations are carried out in a mix-free reactor system, which is one in which substantially no mixing occurs between portions of the reaction mixture that contain polymer chains initiated at different times. Suitable reactors are a continuous flow tubular or a stirred batch reactor. A tubular reactor is well known and is designed to minimize mixing of the reactants in the direction of flow. As a result, reactant concentration will vary along the reactor length. In contrast, the reaction mixture in a continuous flow stirred tank reactor (CFSTR) is blended with the incoming feed to produce a solution of essentially uniform composition everywhere in the reactor. Consequently, the growing chains in a portion of the reaction mixture will have a variety of ages and thus a single CFSTR is not suitable for the process of this invention. However, it is well known that 3 or more stirred tanks in series with all of the catalyst fed to the first reactor can approximate the performance of a tubular reactor. Accordingly, such tanks in series are considered to be in accordance with the present invention.

A batch reactor is a suitable vessel, preferably equipped with adequate agitation, to which the catalyst, solvent, and monomer are added at the start of the polymerization. The charge of reactants is then left to polymerize for a time long enough to produce the desired product or chain segment. For economic reasons, a tubular reactor is preferred to a batch reactor for carrying out the processes of this invention.

In addition to the importance of the reactor system to make copolymers in accordance with the present invention, the polymerization should be conducted such that:
 (a) the catalyst system produces essentially one active catalyst species,
 (b) the reaction mixture is essentially free of chain transfer agents, and
 (c) the polymer chains are essentially all initiated simultaneously, which is at the same time for a batch reactor or at the same point along the length of the tube for a tubular reactor.

To prepare copolymer structures II and III above (and, optionally, to prepare copolymer structure I above), additional solvent and reactants (e.g., at least one of the ethylene, alpha-olefin and diene) will be added either along the length of a tubular reactor or during the course of polymerization in a batch reactor, or to selected stages of stirred reactors in series in a controlled manner (as will be hereinafter described) to form the copolymers of this invention. However, it is necessary to add essentially all of the catalyst at the inlet of the tube or at the onset of batch reactor operation to meet the requirement that essentially all polymer chains are initiated simultaneously.

Accordingly, polymerization in accordance with the present invention are carried out:

(a) in at least one mix-free reactor,
(b) using a catalyst system that produces essentially one active catalyst species,
(c) using at least one reaction mixture which is essentially transfer agent-free, and
(d) in such a manner and under conditions sufficient to initiate propagation of essentially all polymer chains simultaneously.

Since the tubular reactor is the preferred reactor system for carrying out polymerizations in accordance with the present invention, the following illustrative descriptions are drawn to that system, but will apply to other reactor systems as will readily occur to the artisan having the benefit of the present disclosure.

In practicing polymerization processes in accordance with the present invention, use is preferably made of at least one tubular reactor. Thus, in its simplest form, such a process would make use of but a single, reactor. However, as would readily occur to the artisan having the benefit of the present disclosure, a series of reactors could be used with multiple monomer feed to vary intramolecular composition as described below.

The composition of the catalyst used to produce alpha-olefin copolymers has a profound effect on co-polymer product properties such as compositional dispersity and MWD. The catalyst utilized in practicing processes in accordance with the present invention should be such as to yield essentially one active catalyst species in the reaction mixture. More specifically, it should yield one primary active catalyst species which provides for substantially all of the polymerization reaction. Additional active catalyst species could provide as much as 35% (weight) of the total copolymer. Preferably, they should account for about 10% or less of the copolymer. Thus, the essentially one active species should provide for at least 65% of the total copolymer produced, preferably for at least 90% thereof. The extent to which a catalyst species contributes to the polymerization can be readily determined using the below-described techniques for characterizing catalyst according to the number of active catalyst species.

Techniques for characterizing catalyst according to the number of active catalyst species are within the skill of the art, as evidenced by an article entitled "Ethylene-Propylene Copolymers. Reactivity Ratios, Evaluation and Significance", C. Cozewith and G. Ver Strate, *Macromolecules*, 4, 482 (1971), which is incorporated herein by reference.

It is disclosed by the authors that copolymers made in a continuous flow stirred reactor should have an MWD characterized by $\overline{M}_w/\overline{M}_n = 2$ and a narrow Inter-CD when one active catalyst species is present. By a combination of fractionation and gel permeation chromatography (GPC) it is shown that for single active species catalysts the compositions of the fractions vary no more than ±3% about the average and the MWD (weight- to number-average ratio) for these samples approaches 2.

It is this latter characteristic ($\overline{M}_w/\overline{M}_n$ of about 2) that is deemed the more important in identifying a single active catalyst species. On the other hand, other catalysts gave copolymer with an Inter-CD greater than ±10% about the average and multi-modal MWD often with $\overline{M}_w/\overline{M}_n$ greater than 10. These other catalysts are deemed to have more than one active species.

Catalyst systems to be used in carrying out processes in accordance with the present invention may be Ziegler catalysts, which may typically include:

(a) a compound of a transition metal, i.e., a metal of Groups I-B, III-B, IVB, VB, VIB, VIIB and VIII of the Periodic Table, and (b) an organometal compound of a metal of Groups I-A, II-A, II-B and III-A of the Periodic Table.

The preferred catalyst system in practicing processes in accordance with the present invention comprises hydrocarbon-soluble vanadium compound in which the vanadium valence is 3 to 5 and an organo-aluminum compound, with the proviso that the catalyst yields essentially one active catalyst species as described above. At least one of the vanadium compound/organoaluminum pair selected must also contain a valence-bonded halogen.

In terms of formulas, vanadium compounds useful in practicing processes in accordance with the present invention could be:

(1)

where
$x = 0$–3 and R = a hydrocarbon radical;
$VCl_4$;
$VO(AcAc)_2$,
where AcAc = acetyl acetonate which may or may not be alkyl-substituted (e.g. $_1$ to $C_6$ alkyl);
$V(AcAc)_3$;
$V$(dicarbonyl moiety)$_3$;
$VOClx(AcAc)_{3-x}$,
where $x = 1$ or 2;
$V$(dicarbonyl moiety)$_3Cl$; and
$VCl_3.nB$,
where $n = 2$–3, B = Lewis base capable of making hydrocarbon-soluble complexes with $VCl_3$, such as tetrahydrofuran, 2-methyl-tetrahydrofuran and dimethyl pyridine, and the dicarbonyl moiety is derived from a dicarbonyl compound of the formula:

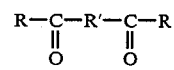

In formula (1) above, each R (which can be the same or different) preferably represents a $C_1$ to $C_{10}$ aliphatic, alicyclic or aromatic hydrocarbon radical such as ethyl (Et), phenyl, isopropyl, butyl, propyl, n-butyl, i-butyl, t-butyl, hexyl, cyclohexyl, octyl, naphthyl, etc. R, preferably represents an alkylene divalent radical of 1 to 6 carbons (e.g., $-CH_2-$, $-C_2H_4-$, etc.). Nonlimiting illustrative examples of formula (1) compounds are vanadyl trihalides, alkoxy halides and alkoxides such as $VOCl_3$, $VOCl_2$(OBu) where Bu = butyl, and $VO(OC_2H_5)_3$. The most preferred vanadium compounds are $VCl_4$, $VOCl_3$, and $VOCl_2$(OR).

As already noted, the co-catalyst is preferably organo-aluminum compound. In terms of chemical formulas, these compounds could be as follows:

| | |
|---|---|
| AlR$_3$, | Al(OR)R$_2$, |
| AlR$_2$Cl, | R$_2$Al—AlR$_2$, |
| AlR, RCl, | AlR$_2$I, |
| Al$_2$R$_3$Cl$_3$, | and |
| AlRCl$_2$, | | where R and R, represent hydrocarbon radicals, the same or different, as described above with respect to the vanadium compound formula. The most preferred organo-aluminum compound is an aluminum alkyl sesquichloride such as Al$_2$Et$_3$Cl$_3$ or Al$_2$(iBu)$_3$Cl$_3$.

In terms of performance, a catalyst system comprised of VCl$_4$ and Al$_2$R$^3$Cl$_3$, preferably where R is ethyl, has been shown to be particularly effective. For best catalyst performance, the molar amounts of catalyst components added to the reaction mixture should provide a molar ratio of aluminum/vanadium (Al/V) of at least about 2. The preferred minimum Al/V is about 4. The maximum Al/V is based primarily on the considerations of catalyst expense and the desire to minimize the amount of chain transfer that may be caused by the organo-aluminum compound (as explained in detail below). Since, as is known certain organo-aluminum compounds act as chain transfer agents, if too much is present in the reaction mixture the $\overline{M}_w/\overline{M}_n$ of the copolymer may rise above 2. Based on these considerations, the maximum Al/V could be about 25, however, a maximum of about 17 is more preferred. The most preferred maximum is about 15.

With reference again to processes for making copolymer in accordance with the present invention, it is well known that certain combinations of vanadium and aluminum compounds that can comprise the catalyst system can cause branching and gelation during the polymerization for polymers containing high levels of diene. To prevent this from happening Lewis bases such as ammonia, tetra-hydrofuran, pyridine, tributylamine, tetrahydrothiophene, etc., can be added to the polymerization system using techniques well known to those skilled in the art.

Chain transfer agents for the Ziegler-catalyzed polymerization of alpha-olefins are well known and are illustrated, by way of example, by hydrogen or diethyl zinc for the production of EPM and EPDM. Such agents are very commonly used to control the molecular weight of EPM and EPDM produced in continuous flow stirred reactors. For the essentially single active species Ziegler catalyst systems used in accordance with the present invention, addition of chain transfer agents to a CFSTR reduces the polymer molecular weight but does not affect the molecular weight distribution. On the other hand, chain transfer reactions during tubular reactor polymerization in accordance with the present invention broaden polymer molecular weight distribution and Inter-CD. Thus the presence of chain transfer agents in the reaction mixture should be minimized or omitted altogether. Although difficult to generalize for all possible reactions, the amount of chain transfer agent used should be limited to those amounts that provide copolymer product in accordance with the desired limits as regards MWD and compositional dispersity. It is believed that the maximum amount of chain transfer agent present in the reaction mixture could be as high as about 0.2 mol/mol of transition metal, e.g., vanadium, again provided that the resulting copolymer product is in accordance with the desired limits as regards MWD and compositional dispersity. Even in the absence of added chain transfer agent, chain transfer reactions can occur because propylene and the organo-aluminum cocatalyst can also act as chain transfer agents. In general, among the organo-aluminum compounds that in combination with the vanadium compound yield just one active species, the organo-aluminum compound that gives the highest copolymer molecular weight at acceptable catalyst activity should be chosen. Furthermore, if the Al/V ratio has an effect on the molecular weight of copolymer product, that Al/V should be used which gives the highest molecular weight also at acceptable catalyst activity. Chain transfer with propylene can best be limited by avoiding excessively elevated temperature during the polymerization as described below.

Molecular weight distribution and Inter-CD are also broadened by catalyst deactivation during the course of the polymerization which leads to termination of growing chains. It is well known that the vanadium-based Ziegler catalysts used in accordance with the present invention are subject to such deactivation reactions which depend to an extent upon the composition of the catalyst. Although the relationship between active catalyst lifetime and catalyst system composition is not known at present, for any given catalyst, deactivation can be reduced by using the shortest residence time and lowest temperature in the reactor that will produce the desired monomer conversions.

Polymerizations in accordance with the present invention should be conducted in such a manner and under conditions sufficient to initiate propagation of essentially all copolymer chains simultaneously. This can be accomplished by utilizing the process steps and conditions described below.

The catalyst components are preferably premixed, that is, reacted to form active catalyst outside of the reactor, to ensure rapid chain initiation. Aging of the premixed catalyst system, that is, the time spent by the catalyst components (e.g., vanadium compound and organo-aluminum) in each other's presence outside of the reactor, should preferably be kept within limits. If not aged for a sufficient period of time, the components will not have reacted with each other sufficiently to yield an adequate quantity of active catalyst species, with the result of nonsimultaneous chain initiation. Also, it is known that the activity of the catalyst species will decrease with time so that the aging must be kept below a maximum limit. It is believed that the minimum aging period, depending on such factors as concentration of catalyst components, temperature and mixing equipment, could be as low as about 0.1 second. The preferred minimum aging period is about 0.5 second, while the most preferred minimum aging period is about 1 second. While the maximum aging period could be higher, for the preferred vanadium/organo-aluminum catalyst system the preferred maximum is about 200 seconds. A more preferred maximum is about 100 seconds. The most preferred maximum aging period is about 50 seconds. The premixing could be performed at low temperature such as 40° C. or below. It is preferred that the premixing be performned at 25° C. or below, with 20° C. or below being most preferred.

Preferably, the catalyst components are premixed in the presence of the selected polymerization diluent or solvent under rapid mixing conditions, e.g., at impingement Reynolds Numbers (NRE) of at least 10,000, more preferably at least 50,000, and most preferably at least 100,000. Impingement Reynolds number is defined as $$N_{RE} = \frac{DN\rho}{\mu}$$

where N is fluid flow velocity (cm./sec.), D is inside tube diameter (cm), $\rho$ is fluid density (g./cm.$^3$) and $\mu$ is fluid viscosity (poise).

The temperature of the reaction mixture should also be kept within certain limits. The temperature at the reactor inlets should be high enough to provide complete, rapid chain initiation at the start of the polymerization reaction. The length of time the reaction mixture spends at high temperature must be short enough to minimize the amount of undesirable chain transfer and catalyst deactivation reactions.

Temperature control of the reaction mixture is complicated somewhat by the fact that the polymerization reaction generates large quantities of heat. This problem is, preferably, taken care of by using prechilled feed to the reactor to absorb the heat of polymerization. With this technique, the reactor is operated adiabatically and the temperature is allowed to increase during the course of polymerization. As an alternative to feed prechill, heat can be removed from the reaction mixture, for example, by a heat exchanger surrounding at least a portion of the reactor or by well-known autorefrigeration techniques in the case of batch reactors or multiple stirred reactors in series.

If adiabatic reactor operation is used, the inlet temperature of the reactor feed could be about from $-50°$ C. to 150° C. It is believed that the outlet temperature of the reaction mixture could be as high as about 200° C. The preferred maximum outlet temperature is about 70° C. The most preferred maximum is about 60° C. In the absence of reactor cooling, such as by a cooling jacket, to remove the heat of polymerization, it has been determined (for a mid-range ethylene content EP copolymer and a solvent with heat capacity similar to hexane) that the temperature of the reaction mixture will increase from reactor inlet to outlet by about 13° C. per weight percent of copolymer in the reaction mixture (weight of copolymer per weight of solvent).

Having the benefit of the above disclosure, it would be well within the skill of the art to determine the operating temperature conditions for making copolymer in accordance with the present invention. For example, assume an adiabatic reactor and an outlet temperature of 35° C. are desired for a reaction mixture containing 5% copolymer. The reaction mixture will increase in temperature by about 13° C. for each weight percent copolymer or 5 wt % $\times$ 13° C./wt. % = 65° C. To maintain an outlet temperature of 35° C., it will thus require a feed that has been prechilled to 35° C.-65° C. = $-30°$ C. In the instance that external cooling is used to absorb the heat of polymerization, the feed inlet temperature could be higher with the other temperature constraints described above otherwise being applicable.

Because of heat removal and reactor temperature limitations, the preferred maximum copolymer concentration at the reactor outlet is 25 wt./100 wt. diluent. The most preferred maximum concentration is 15 wt/100 wt. There is no lower limit to concentration due to reactor operability, but for economic reasons it is preferred to have a copolymer concentration of at least 2 wt/100 wt. Most preferred is a concentration of at least 3 wt/100 wt.

The rate of flow of the reaction mixture through the reactor should be high enough to provide good mixing of the reactants in the radial direction and minimize mixing in the axial direction. Good radial mixing is beneficial not only to both the Intra- and Inter-CD of the copolymer chains but also to minimize radial temperature gradients due to the heat generated by the polymerization reaction. Radial temperature gradients in the case of multiple segment polymers will tend to broaden the molecular weight distribution of the copolymer since the polymerization rate is faster in the high temperature regions resulting from poor heat dissipation. The artisan will recognize that achievement of these objectives is difficult in the case of highly viscous solutions. This problem can be overcome to some extent through the use of radial mixing devices such as static mixers (e.g., those produced by the Kenics Corporation).

It is believed that residence time of the reaction mixture in the mix-free reactor can vary over a wide range. It is believed that the minimum could be as low as about 0.2 second. A preferred minimum is about 0.5 second. The most preferred minimum is about 1 second. It is believed that the maximum could be as high as about 3600 seconds. A preferred maximum is about 40 seconds. The most preferred maximum is about 20 seconds.

Preferably, the fluid flow of the polymerization reaction mass through the tubular reactor will be under turbulent conditions, e.g., at a flow Reynolds Number (NR) of at least 10,000, more preferably at least 50,000, and most preferably at least 100,000 (e.g., 150,000 to 50,000), to provide the desired radial mixing of the fluid in the reactor. Flow Reynolds Number is defined as $$NR = \frac{D'N'\rho}{\mu}$$

wherein N' is fluid flow velocity (cm./sec.), D, is inside tube diameter of the reactor (cm.), $\rho$ is fluid density (g./cm.$^3$) and $\mu$ is fluid viscosity (poise).

If desired, catalyst activators for the selected vanadium catalysts can be used as long as they do not cause the criteria for a mix-free reactor to be violated, typically in amounts up to 20 mol %, generally up to 5 mol %, based on the vanadium catalyst, e.g., butyl perchlorocrotonate, benzoyl chloride, and other activators disclosed in Ser. Nos. 504,945 and 50,946, filed May 15, 1987, the disclosures of which are hereby incorporated by reference in their entirety. Other useful catalyst activators include esters of halogenated organic acids, particularly alkyl trichloroacetates, alkyl tribromoacetates, esters of ethylene glycol monoalkyl (particularly monoethyl) ethers with trichloroacetic acid and alkyl perchlorocrotonates, and acyl halides. Specific examples of these compounds include benzoyl chloride, methyl trichloroacetate, ethyl trichloroacetate, methyl tribromoacetate, ethyl tribromoacetate, ethylene glycol monoethyl ether trichloroacetate, ethylene glycol monoethyl ether tribromoacetate, butyl perchlorocrotonate and methyl perchlorocrotonate.

By practicing processes in accordance with the present invention, alpha-olefin copolymers having very narrow MWD can be made by direct polymerization. Although narrow MWD copolymers can be made using other known techniques, such as by fractionation or mechanical degradation, these techniques are considered to be impractical to the extent of being unsuitable for commercial-scale operation. As regards EPM and EPDM made in accordance with the present invention, the products have good shear stability and (with specific intramolecular CD) excellent low temperature properties which make them especially suitable for lube oil applications.

It is preferred that the Intra-CD of the copolymer is such that at least two portions of an individual intramolecularly heterogeneous chain, each portion comprising at least 5 weight percent of said chain, differ in composition from one another by at least 5 weight percent ethylene. The Intra-CD can be such that at least two portions of copolymer chain differ by at least 10 weight percent ethylene. Differences of at least 20 weight percent, as well as, 40 weight percent ethylene are also considered to be in accordance with the present invention.

It is also preferred that the Inter-CD of the copolymer is such that 95 wt. % of the copolymer chains have an ethylene composition that differs from the copolymer average weight percent ethylene composition by 15 wt. % or less. The preferred Inter-CD is about 13% or less, with the most preferred being about 10% or less.

DEGRADATION OF THE ETHYLENE AND ALPHA-OLEFIN COPOLYMER

The ethylene-α-olefin copolymers in accordance with the instant invention are degraded to form lower molecular weight copolymers by any of the conventional and well-known degradation or molecular weight reduction processes. By degradation or molecular weight reduction processes is meant processes which reduce the molecular weight of the ethylene-α-olefin copolymers of this invention. These degradation processes are generally conventional and well known in the art. Included among these processes are mechanical degradation processes and thermal degradation processes. The mechanical degradation processes generally involve shear assisted breakdown of the copolymer. They may be carried out in the presence of oxygen or in an inert atmosphere, i.e., in the substantial absence of oxygen. They can be conducted in the presence or absence of catalysts and/or accelerators. While generally in mechanical processes the copolymer is either in the solid or melt phase, said processes may be conducted in the presence of solvent, preferably inert solvent.

In the mechanical degradation processes the degree of shear and heat utilized in the process and the length of time that the copolymers are subjected to said shear are those which are effective to degrade the copolymer, i.e., reduce the molecular weight of the copolymer to the desired molecular weight (i.e., $\overline{M}_n$ of about 15,000 to about 150,000) and thickening efficiency. If catalysts are utilized the amount of catalyst employed is a catalytic effective amount, i.e., an amount effective to catalyze the degradation reaction.

The thermal degradation processes may be carried out in the presence of oxygen, i.e., thermal oxidative degradation, or under an inert atmosphere, i.e., in the substantial absence of oxygen. They are generally, although not always, conducted on a composition comprising the copolymer and an inert solvent or diluent, e.g., copolymer-inert solvent solution. Various catalysts and/or accelerators may also be used in these thermal degradation processes.

The thermal degradation processes are carried out at temperatures and for periods of time which are effective to degrade the copolymer, i.e., reduce the molecular weight of the copolymer to the desired molecular weights (i.e., $\overline{M}_n$ of from about 15,000 to about 150,000) and thickening efficiency. If catalysts are utilized, the amount of catalyst employed is a catalytic effective amount, i.e., an amount effective to catalyze the degradation process.

One such mechanical degradation process comprises the shear assisted oxidation or mechanical breakdown and oxidation of the copolymers in the presence of an oxygen-containing gas such as air in a mechanical mixer such as an extruder, masticator, Banbury mixer, rubber mill, or the like. The mechanical breakdown and oxidation of the copolymer may be done with a single piece of equipment, or may be done in stages with increasing intensity of the degree of breakdown which takes place and the amount of oxygen incorporated in the polymer. It is preferred to operate in the absence of solvent or fluxing oil so the polymer is readily exposed to air. Useful equipment includes Banbury mixers and mills having adjustable gaps, which devices may be enclosed in jacketed containers through which a heating medium may be passed such as superatmospheric stream or heated DOWTHERM$\pi$. When mastication or breakdown has reached a desired level, as determined by oxygen uptake and reduction in thickening efficiency (T.E.) as defined below, a fluxing oil may be added to the degraded polymer. Usually enough oil is added to provide a concentration of degraded polymer in the range of about 5 weight percent to 50 weight percent based on the weight of the total resulting solution. Useful temperatures for oxidatively degrading the polymers are in the range of about 250° to 750° F. The time required to achieve satisfactory results will depend on the type of degrading or mastication equipment, the temperature of degrading, and particularly the speed of rotation if using a blade mixer as the degrading or masticating device. For example, the Bramley Beken Blade Mixer can be used in providing a single piece of equipment, the desired degree of mastication, or milling and oxidative degradation. This mixer, which is equipped with a variable speed drive, has two rollers, fitted with helically disposed knives geared so that one roller revolves at one-half the speed of the other. The rollers are journalled in a jacketed reactor having two hemispherical halves in its base, which conform to the radii of the two rollers. Superheated stream, or heated DOWTHERM$\pi$, may be circulated through the jacket to provide the desired temperature.

Additionally, various catalysts and/or accelerators can be employed to accelerate the degradation of the copolymer. The catalysts include metals or metal salts or complexes such as copper, vanadium, chromium, manganese, nickel, iron, cobalt, molybdenum and their salts and complexes such as oleates, naphthenates, octoates, carboxylates, stearates and other long chain, oil soluble, organic acid salts. Other catalysts and/or cocatalysts include the peroxides such as dibenzoyl peroxide, diocyl peroxides, and dialkyl peroxides. Other suitable peroxide catalysts are disclosed in U.S. Pat. No. 3,313,793, incorporated herein by reference. One type of a catalytic, oxidative, shear accelerated process is disclosed in U.S. application Ser. No. 241,620, filed Sep. 8, 1988, incorporated herein by reference.

The period of time that is generally required to achieve the desired reduction in molecular weight and thickening efficiency will vary depending upon the temperature, RPM and horsepower of the mixer, catalyst (if any), and the amount of catalyst and accelerator used. However, a time period of about 2 minutes to about 12 hours is generally adequate depending upon the degree to which it is desired to reduce the T.E. and molecular weight.

Another method for the mechanical degradation or shearing of the ethylene-α-olefin copolymer comprises oxidizing the copolymer in a closed vessel equipped with shearing blades. A typical apparatus of this type is a device containing counter-rotating helical blades and known as a "Brabender Torque Rheometer". Typically, means are provided for supplying air, oxygen, or another oxygen-containing gas to the shearing cavity of the vessel. Alternatively, or additionally, the oxygen source may be a nongaseous material such as a peroxide, placed in the reaction chamber with the copolymer; this may also have a beneficial effect on the reaction rate. It is preferred, however, that a gaseous source of oxygen be used. Although normally an outside source of gaseous oxygen is provided, this is not absolutely necessary. When the usual outside source is used, however, the gas may be supplied to the shearing cavity at any convenient flow rate. Normally, air or oxygen is provided at a rate sufficient to exchange all the air or oxygen in the shearing cavity every few seconds. Means are also provided for maintaining the shearing cavity at an elevated temperature, usually in the range of about 170°–230° C. preferably 180°–225° C.

These mechanical degradation or shearing processes may also be carried out under an inert gas or atmosphere such as nitrogen, i.e., in the substantial absence of oxygen.

One such shear assisted degradation carried out under an inert atmosphere may be carried out in a masticator, a rubber mill, a Banbury mixer, Brabender mixers, and other mechanical mixing devices which can mix or knead the ethylene-α-olefin copolymer, rubber at elevated temperatures with the other components of the reaction into a homogeneous solid rubbery mass so degradation can take place in the solid state. Combinations of equipment may also be used, such as a low temperature mixer for premixing the ingredients, following which they can be transferred to a high temperature heated mixer for degradation.

The degradation is preferably carried out using free radical initiators such as peroxides, and preferably those which have a boiling point greater than about 100° C. Representative of these free-radical initiators are dilauroyl peroxide, 2,5-di-methyl-hex-3-yne-2, 5 bis-tertiary-butyl peroxide (sold as Lupersol 130) or its hexane analogue, di-tertiary butyl peroxide and dicumyl peroxide. The presence of an acid, e.g. maleic anhydride, with the peroxide is preferred as it catalyzes the decomposition of the peroxide to activate the peroxide. Other activators of the peroxide, other than acid, can be used such as the hydroperoxides disclosed by European Published Patent Application 0123424, including cumene hydroperoxide, hydrogen peroxide, tertiary butyl hydroperoxide, etc. The initiator is generally used at a level of between about 0.005% and about 1%, e.g. 0.05 to 0.5%, based on the total weight of the olefin polymer, and temperatures of about 120° to 250° C.

The initiator degradation is preferably carried out at 120°–250° C., more preferably 150°–220° C. An inert atmosphere, such as that obtained by nitrogen blanketing is used. The total time for degradation and/or grafting will usually range from about 0.005 to 12 hours. If carried out in an extruder, the total time will be relatively short, e.g. 0,005 to 0.2 hours. In a masticator usually from about 0.5 to 6 hours, more preferably 0.5 to 3 hours total time will be required. The degradation reaction will be usually carried out to at least approximately 4 times, preferably at least about 6 times the half-life of the free-radical initiator at the reaction temperature employed, e.g. with 2,5-dimethyl hex-3-yne-2, 5-bis(t-butyl peroxide) 2 hours at 160° C. and one hour at 170° C., etc.

Degradation can take place separately by heating and mixing with the initiator, preferably under shearing stress.

Another molecular weight degradation process involves thermal degradation of the copolymer in the absence of oxygen. One such thermal degradation process involves heating the ethylene-α-olefin copolymer in the presence of catalytic amount of catalyst, preferably from 0.075% to 10%, in the absence of oxygen to a temperature of from 275° to 450° C. or higher, particularly when using superatmospheric pressure conditions, preferably to a temperature of from 300° to 400° C. for a period which will vary depending upon the temperature, catalyst and the amount of catalyst used, which time period is adequate to produce the desired reduction in molecular weight. Employing catalysts in amounts and at temperatures within the upper portion of the above-mentioned respective ranges, the time of heating can be as little as five minutes; using an amount of catalyst in the lower portion at the lower temperatures, within the aforesaid range of 0.075% to 10%, the time of heating can be from four to five hours.

The catalysts are generally those which are known in the art for thermal degradation processes and include: (i) an oxide or (ii) carbonate of an alkali metal, alkaline earth metal, or a heavy metal, namely, antimony, bismuth, cadmium, chromium, copper, iron lead, mercury, tantalum, titanium, thallium, vanadium and zinc; metal salts of aminocarboxylic, dicarboxylic or tricarboxylic aliphatic, phenyl or naphtyl carboxylic acid such as those disclosed in U.S. Pat. No. 3,332,926, incorporated herein by reference; and the like.

The heating of the polymer, catalyst mixture can be carried out in any suitable closed equipment such as a batch reactor or continuous reactor through which the mixture of polymer and catalyst is passed continuously for the necessary residence time to produce at the temperature of operation the desired lower molecular weight polyolefin. The heating can be carried out under vacuum, at ambient pressures or under superatmospheric pressure conditions. In the case of batch operations at ambient or superatmospheric pressure conditions, the heating can be carried out under a blanket of nitrogen or other free atmosphere.

If desired, the mixture of catalyst and polymer can be stirred or agitated during the heating.

The thermal oxidative degradation process involves heating the ehtylene-α-olefin copolymer at a temperature of at least about 100° C. in the presence of oxygen or air so as to cause degradation of the copolymer. Such degradation is usually characterized by a substantial reduction of the molecular weight of the copolymer.

A particularly useful method of preparing the oxidized and degraded copolymer involves heating a fluid solution of copolymer in an inert solvent and bubbling oxygen or air through the solution at a temperature of at least 100° C. until the desired degradation is achieved. In lieu of oxygen or air, any mixture of oxygen and inert gas such as nitrogen or carbon dioxide may be used.

The inert gas thus functions as a carrier of oxygen and often provides a convenient means of introducing oxygen into the reaction mixture.

The inert solvent useful in preparing the fluid solution of the copolymer reactant is preferably a liquid inert hydrocarbon such as naphtha, hexene, cyclohexene, dodecane, biphenyl, xylene or toluene. It may be a polar solvent such as diphenyl oxide. The amount of the solvent to be used is not critical so long as a sufficient amount is used to result in the fluid solution of the interpolymer. Such solution usually contains from about 60 to 95% of a solvent.

The temperature at which the copolymer is oxidized and degraded is at least about 100° C., preferably at least about 150° C. and it may be as high as 250° C., 300° C. or even higher.

The copolymers of the instant invention may also be degraded to lower molecular weights by homogenization. The homogenization process is conventional and known in the art. In the homogenization process the copolymer, generally in a liquid state such as, for example, in a solution of copolymer dissolved in a solvent such as those described above, is forced at high pressure through a device which utilizes variously designed throttle valves and narrow orifices. Such a device can generate very high shear rates. Commercial devices such as that from the Manton-Gaulin Manufacturing Company or modifications thereof may be employed. Such equipment may be operated at pressures of up to about 20,000 psi to generate the necessary shear stress. The homogenization process may be employed in batch or contiuous mode, depending on the degree of degradation desired.

The degraded ethylene-alpha-olefin copolymers, preferably degraded ethylene-propylene copolymers, have number average molecular weights of from about 15,000 to about 300,000, preferably from about 20,000 to about 250,000, more preferably from about 20,000 to about 150,000.

GRAFTING MATERIALS

The materials or compounds that are grafted on the degraded ethylene copolymers to form the grafted degraded ethylene copolymers of the instant invention are generally those materials that can be grafted onto said degraded ethylene copolymers to form the grafted degraded ethylene copolymers, which grafted degraded copolymers are then reacted with the amido-amines or with the carboxylic acid components and amido-amines to form the nitrogen containing grafted degraded ethylene copolymers of the instant invention. These materials preferably contain olefinic unsaturation and further preferably contain at least one of carboxylic acid moiety, ester moiety, or anhydride moiety. The olefinically unsaturated portion, i.e., ethylenically unsaturated portion, is one which is capable of reacting with the ethylene copolymer backbone, and upon reaction therewith becomes saturated.

These materials are generally well known in the art as grafting materials and are generally commercially available or may be readily prepared by well known conventional methods.

The preferred grafting materials are the carboxylic acid materials. The carboxylic acid material which is grafted to or reacted with the degraded ethylene copolymer to form the grafted degraded ethylene copolymer is preferably ethylenically unsaturated, preferably monounsaturated, carboxylic acid material and can be either a monocarboxylic or dicarboxylic acid material. The dicarboxylic acid materials include (1) monounsaturated $C_4$ to $C_{10}$ dicarboxylic acid wherein (a) the carboxyl groups are vicinyl, i.e., located on adjacent carbon atoms, and (b) at least one, preferably both, of said adjacent carbon atoms are part of said monounsaturation; and (2) derivatives of (1) such as anhydrides or $C_1$ to $C_5$ alcohol derived mono- or diesters of (1). Upon reaction with the ethylene copolymer the monounsaturation of the dicarboxylic acid, anhydride, or ester becomes saturated. Thus, for example, maleic anhydride becomes an ethylene copolymer substituted succinic anhydride.

The monocarboxylic acid materials include (1) monounsaturated $C_3$ to $C_{10}$ monocarboxylic acid wherein the carbon-carbon bond is conjugated to the carboxy group, i.e., of the structure

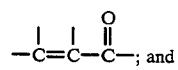; and (2) derivatives of (1) such as $C_1$ to $C_5$ alcohol derived monoesters of (1). Upon reaction with the ethylene copolymer, the monounsaturation of the monounsaturated carboxylic acid material becomes saturated. Thus, for example, acrylic acid becomes an ethylene copolymer substituted propionic acid, and methacrylic acid becomes an ethylene copolymer substituted isobutyric acid.

Exemplary of such unsaturated mono- and dicarboxylic acids, or anhydrides and thereof include fumaric acid, itaconic acid, maleic acid, maleic anhydride, chloromaleic anhydride, acrylic acid, methacrylic acid, crotonic acid, cinnamic acid, methyl acrylate, ethyl acrylate, methyl methacrylate, etc.

Preferred carboxylic acid materials are the dicarboxylic acid anhydrides. Maleic anhydride or a derivative thereof is particularly preferred as it does not appear to homopolymerize appreciably but grafts onto the ethylene copolymer to give two carboxylic acid functionalities. Such preferred materials have the generic formula

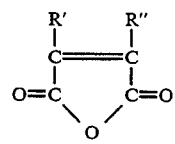

wherein R' and R" are independently hydrogen or a halogen.

Additionally, as taught by U.S. Pat. Nos. 4,160,739 and 4,161,452, both of which are incorporated herein by reference, various unsaturated comonomers may be grafted on the ethylene copolymer together with the unsaturated carboxylic acid material. Such graft monomer systems may comprise one or a mixture of comonomers different from said unsaturated carboxylic acid material, and which contain only one copolymerizable double bond and are copolymerizable with said unsaturated acid component.

Typically, such comohomers do not contain free carboxylic acid groups and are esters containing alpha-ethylenic unsaturation in the acid or alcohol portion; hydrocarbons, both aliphatic and aromatic, containing , alpha-ethylenic unsaturation, such as the $C_4$-$C_{12}$ alpha olefins, for example hexene, nonene, dodecene, etc.; styrenes, for example styrene, alpha-methyl styrene, p-methyl styrene, butyl styrene, etc.; and vinyl monomers, for example vinyl acetate, vinyl chloride, vinyl ketones such as methyl and ethyl vinyl ketone, and nitrogen containing vinyl monomer such as vinyl pyridine and vinyl pyrrolidine, etc. Comonomers containing functional groups which may cause crosslinking, gelation or other interfering reactions should be avoided, although minor amounts of such comonomers (up to about 10% by weight of the comonomer system) often can be tolerated.

Specific useful copolymerizable comohomers include the following:

(A) Esters of saturated acids and unsaturated alcohols wherein the saturated acids may be monobasic or polybasic acids containing up to about 40 carbon atoms such as the following: acetic, propionic, butyric, valetic, caproic, stearic, oxalic, malonic, succinic, glutaric, adipic, pimelic, suberic, azelaic, sebacic, phthalic, isophthalic, terephthalic, hemimellitic, trimellitic, trimesic and the like, including mixtures. The unsaturated alcohols may be monohydroxy or polyhydroxy alcohols and may contain up to about 40 carbon atoms, such as the following: allyl, methallyl, crotyl, 1-chloroallyl, 2-chloroallyl, cinnamyl, vinyl, methyl vinyl, 1-phenallyl, butenyl, propargyl, 1-cyclohexene-3-ol, oleyl, and the like, including mixtures.

(B) Esters of unsaturated monocarboxylic acids containing up to about 12 carbon atoms such as acrylic, methacrylic and crotonic acid, and an esterifying agent containing up to about 50 carbon atoms, selected from saturated alcohols and alcohol epoxides. The saturated alcohols may preferably contain up to about 40 carbon atoms and include monohydroxy compounds such as: methanol, ethanol, propanol, butanol, 2-ethylhexanol, octanol, dodecanol, cyclohexanol, cyclopentanol, neopentyl alcohol, and benzyl alcohol; and alcohol ethers such as the monomethyl or monobutyl ethers of ethylene or propylene glycol, and the like, including mixtures. The alcohol epoxides include fatty alcohol epoxides, glycidol, and various derivatives of alkylene oxides, epichlorohydrin, and the like, including mixtures.

The components of the graft copolymerizable system are used in a ratio of unsaturated carboxylic acid material monomer component to comonomer component of about 1:4 to 4:1, preferably about 12 to 2:1 by weight.

GRAFTING OF THE DEGRADED IN MOLECULAR WEIGHT ETHYLENE COPOLYMERS

Grafting of the degraded ethylene copolymer with the grafting material may be conducted by conventional grafting processes. The conventional grafting of the degraded ethylene copolymer with the grafting material such as carboxylic acid material may be by any suitable and well-known conventional method such as thermally by the "ene" reaction, using copolymers containing unsaturation, such as ethylene-propylene-diene polymers either chlorinated or unchlorinated, or more preferably it is by free-radical induced grafting in solvent, preferably in a mineral lubricating oil as solvent.

The radical grafting is preferably carried out using free radical initiators such as peroxides, hydroperoxides, and azo compounds and preferably those which have a boiling point greater than about 100° C. and which decompose thermally within the grafting temperature range to provide said free radicals. The initiator is generally used at a level of between about 0,005% and about 1%, based on the total weight of the polymer solution, and temperatures of about 150° to 250° C., preferably from about 150° C. to about 220° C. are used.

The ethylenically unsaturated carboxylic acid material, such as maleic anhydride, will be generally used in an amount ranging from about 0.01% to about 10%, preferably 0.1 to 2.0%, based on weight of the initial total solution. The aforesaid carboxylic acid material and free radical initiator are generally used in a weight percent ratio range of 1.0:1 to 30:1, preferably 3.0:1 to 6:1.

In the practice of the instant invention when these ethylenically unsaturated grafting materials are grafted onto the aforedescribed degraded ethylene copolymer the resultant grafted degraded copolymer contains the residue of the degraded ethylene copolymer as the backbone and the residue of the ethylenically unsaturated grafting material as the grafted moiety. By residues is meant the respective moieties produced by and remaining after the grafting process or reaction. Thus, for example, while the ethylenically unsaturated grafting material may be maleic anhydride, after the grafting reaction it is the succinic anhydride moiety that is grafted or attached to the degraded ethylene copolymer backbone. Thus, this succinic anhydride moiety is referred to herein as the residue of the ethylenically unsaturated grafting material, i.e., residue of maleic anhydride.

A preferred method of grafting is by free-radical induced grafting in solvent, preferably in a mineral lubricating oil as solvent. The free-radical grafting is preferably carried out using free radical initiators such as peroxides, hydroperoxides, and azo compounds and preferably those which have a boiling point greater than about 100° C. and which decompose thermally within the grafting temperature range to provide said free radicals. Representative of these free-radical initiators are asobutyro-nitrile, 2,5-di-methyl-hex-3-yne-2, bis-tertiary-butyl peroxide (sold as Lupersol 130) or its hexane analogue, di-tertiary butyl peroxide and dicumyl peroxide. The initiator is generally used at a level of between about 0,005% and about 1%, based on the toal weight of the polymer solution, and temperatures of about 150° to 220° C.

The initiator grafting is preferably carried out in an inert atmosphere, such as that obtained by nitrogen blanketing. While the grafting can be carried out in the presence of air, the yield of the desired graft polymer is generally thereby decreased as compared to grafting under an inert atmosphere substantially free of oxygen. The grafting time will usually range from about 0.1 to 12 hours, preferably from about 0.5 to 6 hours, more preferably 0.5 to 3 hours. The graft reaction will be usually carried out to at least approximately 4 times, preferably at least about 6 times the half-life of the free-radical initiator at the reaction temperature employed, e.g. with 2,5-dimethyl hex-3-yne-2, 5-bis(t-butyl peroxide) 2 hours at 160° C. and one hour at 170° C., etc.

In the grafting process, usually the copolymer solution is first heated to grafting temperature and thereafter said grafting material such as unsaturated carboxylic acid material and initiator are added with agitation, although they could have been added prior to heating. When the reaction is complete, the excess grafting material can be eliminated by an inert gas purge, e.g. nitrogen sparging. Preferably the grafting material such as carboxylic acid material that is added is kept below its solubility limit in the polymer solution, e.g. below about 1 wt. %, preferably below 0.4 wt. % or less, of free maleic anhydride based on the total weight of polymer-solvent solution, e.g. ethylene copolymer mineral lubricating oil solution. Continuous or periodic addition of the grafting material such as carboxylic acid material along with an appropriate portion of initiator, during the course of the reaction, can be utilized to maintain the grafting material such as carboxylic acid material below its solubility limits, while still obtaining the desired degree of total grafting.

In the initiator grafting step the maleic anhydride or other carboxylic acid material used will be grafted onto both the degraded copolymer and the solvent for the reaction. Many solvents such as dichlorobenzene are relatively inert and may be only slightly grafted, while mineral oil will tend to be more grafted. The exact split of graft between the substrate present depends upon the polymer and its reactivity, the reactivity and type of oil, the concentration of the polymer in the oil, and also upon the maintenance of the carboxylic acid material in solution during the course of the reaction and minimizing the presence of dispersed, but undissolved acid, e.g. the maleic anhydride. The undissolved acid material appears to have an increased tendency to react to form oil insoluble materials as opposed to dissolved acid material. The split between grafted oil and grafted polymer may be measured empirically from the infrared analyses of the product dialyzed into oil and polymer fractions.

The grafting is preferably carried out in a mineral lubricating oil which need not be removed after the grafting step but can be used as the solvent in the subsequent reaction of the graft polymer with the amido-amine or thioamido-amine and as a solvent for the end product to form the lubricating additive concentrate.

The amount of grafting material such as carboxylic acid material used in the grafting reaction is an amount which is effective to provide a grafted degraded ethylene copolymer which upon further reaction with the amido-amine or thioamido-amine as described hereinafter provides a material exhibiting the properties of a multifunctional viscosity index improver additive, more specifically a viscosity index improver-dispersant additive, i.e., a material having both V.I. improving and dispersancy properties in an oleaginous composition. That is to say, an amount which is effective to provide, upon reaction of the grafted degraded ethylene copolymer with the amido-amine or thioamido-amine, an oleaginous composition exhibiting improved viscometric, particularly low temperature viscometric, and dispersancy properties. Generally, this amount of grafting material, e.g., moles of carboxylic acid material such as maleic anhydride, is an amount which is effective to provide a grafted degraded ethylene copolymer, e.g., ethylene-alpha-olefin substituted carboxylic acid material such as ethylene- propylene substituted succinic anhydride, containing an average number of acid material moieties, e.g., succinic anhydride, grafted to or present on a 10,000 number average molecular weight segment of a mole of degraded ethylene copolymer of at least about 0.1, preferably at least about 0.5, and more preferably at least about 1. The maximum average number of grafted moieties present per 10,000 average number molecular weight segment of a mole of degraded ethylene copolymer backbone should not exceed about 10, preferably about 7 and more preferably about 5. Preferably, the average number, moles, of grafted moieties present per mole of ethylene copolymer backbone is at least about 0.6, preferably at least about 0.8, and more preferably at least about 1. Preferably, the maximum average number of grafted moieties grafted to or present per mole of degraded ethylene copolymer backbone should generally not exceed about 10, preferably about 7, and more preferably about 5. Thus, for example, a mole of grafted degraded ethylene copolymer, e.g., ethylene-propylene substituted succinic anhydride, containing a degraded ethylene copolymer backbone such as a degraded ethylene- propylene backbone having an average number molecular weight of 50,000 contains grafted to said backbone an average number of succinic anhydride moieties of from about 0.5 to about 50, preferably from about 0.6 to about 10. Typically, from about 0.2 to about 12, preferably from about 0.4 to about 6 moles of said carboxylic acid material are charged to the reactor per mole of degraded ethylene copolymer charged.

Normally, not all of the degraded ethylene copolymer reacts with the carboxylic acid material, e.g., maleic anhydride, to produce a grafted degraded ethylene copolymer, e.g., ethylene-propylene substituted succinic anhydride. The resultant reaction product mixture, therefore, contains reacted or grafted ethylene copolymer, e.g., ethylene-propylene substituted succinic anhydride, unreacted or ungrafted ethylene copolymer, and unreacted grafting material, e.g., maleic anhydride. The unreacted ethylene copolymer is typically not removed from the reaction product mixture, and the reaction product mixture, generally stripped of any unreacted grafting material, is utilized as is or is employed for further reaction with the amine as described hereinafter.

Characterization of the average number of moles of grafting material such as carboxylic acid material, e.g., maleic anhydride, which have reacted per mole of degraded ethylene copolymer charged to the reaction (whether it has undergone reaction or not) is defined herein as the average number of grafted moieties grafted to or present per mole of ethylene copolymer the resulting reaction product mixture can be subsequently modified, i.e., increased or decreased by techniques known in the art, such modifications do not alter the average number of grafted moieties as defined aboe. The term grafted degraded ethylene copolymer is intended to refer to the reaction product mixture whether it has undergone such modification or not.

The grafted, preferably acid material grafted, degraded ethylene copolymer is reacted with the amido-amine or thioamido-amine to form the nitrogen containing grafted degraded ethylene copolymers of the instant invention.

THE AMIDO-AMINE

As described supra, the amido-amine comprises a reaction product of at least one amine and an alpha, beta-ethylenically unsaturated compound of formula

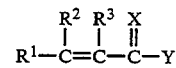

wherein X is sulfur or oxygen, Y is $-OR^4$, $-SR^4$, or $-NR^4(R^5)$, and $R^1$, $R^2$, $R^3$, $R^4$ and $R^5$ are the same or different and are hydrogen or substituted or unsubstituted hydrocarbyl.

The polyamines useful in this invention comprise polyamines, most preferably polyalkylene polyamines, of about 2 to 60, preferably 2 to 40 (e.g. 3 to 20), total carbon atoms and about 1 to 12, preferably 2 to 12, more preferably 3 to 12, and most preferably at least 5 (e.g., 5 to 9) nitrogen atoms in the molecule. These amines may be hydrocarbyl amines or may be hydrocarbyl amines including other groups, e.g, hydroxy groups, alkoxy groups, amide groups, nitriles, imidazoline groups, and the like. Hydroxy amines with 1 to 6 hydroxy groups, preferably 1 to 3 hydroxy groups are particularly useful. Preferred amines are aliphatic saturated amines, including those of the general formulas:

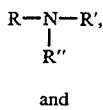
(II)

and

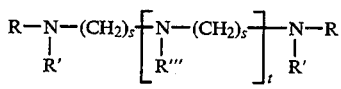
(III)

wherein R, R', R" and R''' are independently selected from the group consisting of hydrogen; $C_1$ to $C_{25}$ straight or branched chain alkyl radicals; $C_1$ to $C_{12}$ alkoxy $C_2$ to $C_6$ alkylene radicals; $C_2$ to $C_{12}$ hydroxy amino alkylene radicals; and $C_1$ to $C_{12}$ alkylamino $C_2$ to $C_6$ alkylene radicals; and wherein R''' can additionally comprise a moiety of the formula:

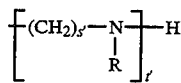
(IV)

wherein R' is as defined above, and wherein s and s' can be the same or a different number of from 2 to 6, preferably 2 to 4; and t and t' can be the same or different and are numbers of from 0 to 10, preferably 2 to 7, and most preferably about 3 to 7, with the proviso that the sum of t and t' is not greater than 15. To assure a facile reaction, it is preferred that R, R', R", R''', s, s', t and t' be selected in a manner sufficient to provide the compounds of Formulas II and III with typically at least one primary or secondary amine group, preferably at least two primary or secondary amine groups. This can be achieved by selecting at least one of said R, R', R" or R''' groups to be hydrogen or by letting t in Formula III be at least one when R''' is H or when the IV moiety possesses a secondary amino group. The most preferred amine of the above formulas are represented by Formula III and contain at least two primary amine groups and at least one, and preferably at least three, secondary amine groups.

Non-limiting examples of suitable amine compounds include: 1,2-diaminoethane; 1,3-diaminopropane; 1,4-diaminobutane; 1,6-diaminohexane; polyethylene amines such as diethylene triamine; triethylene tetramine; tetraethylene pentamine; polypropylene amines such as 1,2-propylene diamine; di-(1,2-propylene)triamine; di-(1,3-propylene) triamine; N,N-dimethyl-1,3-di aminopropane; N,N-di-(2-aminoethyl) ethylene diamine; N,N-di(2-hydroxyethyl)-1,3-propylene diamine; 3-dodecyloxypropylamine; N-dodecyl-1,3-propane diamine; tris hydroxymethylaminomethane (THAM); diisopropanol amine; diethanol amine; triethanol amine; mono-, di-, and tri-tallow amines; amino morpholines such as N-(3-amino-propyl)morpholine; and mixtures thereof.

Other useful amine compounds include: alicyclic diamines such as 1,4-di(aminomethyl) cyclohexane, and heterocyclic nitrogen compounds such as imidazolines, and N-aminoalkyl piperazines of the general formula (V):

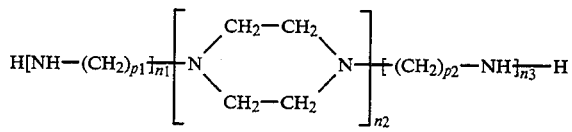

wherein $P_1$ and $P_2$ are the same or different and are each integers of from 1 to 4, and $n_1$, $n_2$ and $n_3$ are the same or different and are each integers of from 1 to 3. Non-limiting examples of such amines include 2-pentadecyl imidazoline: N-(2-aminoethyl) piperazine; etc.

Commercial mixtures of amine compounds may advantageously be used. For example, one process for preparing alkylene amines involves the reaction of an involves the reaction of an alkylene dihalide (such as ethylene dichloride or propylene dichloride) with ammonia, which results in a complex mixture of alkylene amines wherein pairs of nitrogens are joined by alkylene groups, forming such compounds as diethylene triamine, triethylene-tetramine, tetraethylene pentamine and isomeric piperazines.

Low cost poly(ethyleneamines) compounds averaging about 5 to 7 nitrogen atoms per molecule are available commercially under trade names such as "Polyamine H", "Polyamine 400", "Dow Polyamine E-100", etc.

Useful amines also include polyoxyalkylene polyamines such as those of the formulae:

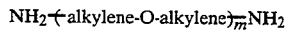
(VI)

where m has a value of about 3 to 70 and preferably 10 to 35; and

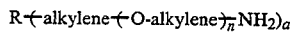
(VII)

where "n" has a value of about 1 to 40 with the provision that the sum of all the n's is from about 3 to about 70 and preferably from about 6 to about 35, and R is a polyvalent saturated hydrocarbon radical of up to ten carbon atoms wherein the number of substituents on the R group is represented by the value of "a", which is a number of from 3 to 6. The alkylene groups in either formula (VI) or (VII) may be straight or branched chains containing about 2 to 7, and preferably about 2 to 4 carbon atoms.

The polyoxyalkylene polyamines of formulas (VI) or (VII) above, preferably polyoxyalkylene diamines and polyoxyalkylene triamines, may have average molecular weights ranging from about 200 to about 4000 and preferably from about 400 to about 2000. The preferred polyoxyalkylene polyoxyalkylene polyamines include the polyoxyethylene and polyoxypropylene diamines and the polyoxypropylene triamines having average molecular weights ranging from about 200 to 2000. The polyoxyalkylene polyamines are commercially available and may be obtained, for example, from the Jefferson Chemical Company, Inc. under the trade name "Jeffamines D-230, D-400, D-1000, D-2000, T-403", etc.

Additional amines useful in the present invention are described in U.S. Pat. No. 3,445,441, the disclosure of which is hereby incorporated by reference in its entirety.

Thus, any polyamine, whether aliphatic, cycloaliphatic, aromatic, heterocyclic, etc., can be employed provided it is capable of adding across the acrylic double bond and amidifying with for example the carbonyl group (—C(O)—) of the acrylate-type compound of formula I, or with the thiocarbonyl group (—C(S)—) of the thioacrylate-type compound of formula I.

The alpha, beta ethylenically unsaturated compounds employed in this invention comprise at least one member selected from the group consisting of alpha, beta ethylenically unsaturated compounds of the formula:

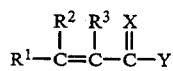
(I)

wherein X is sulfur or oxygen, Y is —$OR^4$, —$SR^4$, or —$NR^4(R^5)$, and $R^1$, $R^2$, $R^3$, $R^4$ and $R^5$ are the same or different and are hydrogen or substituted or unsubstituted hydrocarbyl.

When $R^1$, $R^2$, $R^3$, $R^4$ or $R^5$ are hydrocarbyl, these groups can comprise alkyl, cycloalkyl, aryl, alkaryl, aralkyl or heterocyclic, which can be substituted with groups which are substantially inert to any component of the reaction mixture under conditions selected for preparation of the amido-amine. Such substituent groups include hydroxy, halide (e.g., Cl, Fl, I, Br), —SH and alkylthio. When one or more of $R^1$ through $R^5$ are alkyl, such alkyl groups can be straight or branched chain, and will generally contain from 1 to more usually from 1 to 10, and preferably from 1 to carbon atoms. Illustrative of such alkyl groups are methyl, ethyl, propyl, butyl, pentyl, hexyl, heptyl, octyl, nonyl, decyl, dodecyl, tridecyl, hexadecyl, octadecyl and the like. When one or more of $R^1$ through $R^5$ are aryl, the aryl group will generally contain from 6 to 10 carbon atoms (e.g., phenyl, naphthyl).

When one or more of $R^1$ through $R^5$ are alkaryl, the alkaryl group will generally contain from about 7 to 20 carbon atoms, and preferably from 7 to 12 carbon atoms. Illustrative of such alkaryl groups are tolyl, m-ethylphenyl, o-ethyltolyl, and m-hexyltolyl. When one or more of $R^1$ through $R^5$ are aralkyl, the aryl component generally consists of phenyl or ($C_1$ to $C_6$) alkyl-substituted phenol and the alkyl component generally contains from 1 to 12 carbon atoms, and preferably from 1 to 6 carbon atoms. Examples of such aralkyl groups are benzyl, o-ethylbenzyl, and 4-isobutylbenzyl. When one or more of $R^1$ and $R^5$ are cycloalkyl, the cycloalkyl group will generally contain from 3 to 12 carbon atoms, and preferably from 3 to 6 carbon atoms. Illustrative of such cycloalkyl groups are cyclopropyl, cyclobutyl, cyclohexyl, cyclooctyl, and cyclododecyl. When one or more of $R^1$ through $R^5$ are heterocyclic, the heterocyclic group generally consists of a compound having at least one ring of 6 to 12 members in which on or more ring carbon atoms is replaced by oxygen or nitrogen. Examples of such heterocyclic groups are furyl, pyranyl, pyridyl, piperidyl, dioxanyl, tetrahydrofuryl, pyrazinyl and 1,4-oxazinyl.

The alpha, beta ethylenically unsaturated carboxylate compounds employed herein have the following formula:

(VIII)

wherein $R^1$, $R^2$, $R^3$, and $R^4$ are the same or different and are hydrogen or substituted or unsubstituted hydrocarbyl as defined above. Examples of such alpha, beta-ethylenically unsaturated carboxylate compounds of formula VIII are acrylic acid, methacrylic acid, the methyl, ethyl, isopropyl, n-butyl, and isobutyl esters of acrylic and methacrylic acids, 2-butenoic acid, 2-hexenoic acid, 2-decenoic acid, 3-methyl-2-heptenoic acid, 3-methyl-2-butenoic acid, 3-phenyl-2-propenoic acid, 3-cyclohexyl-2-butenoic acid, 2-methyl-2-butenoic acid, 2-propyl-2-propenoic acid, 2-isopropyl-2-hexenoic acid, 2,3-dimethyl-2-butenoic acid, 3-cyclohexyl-2-methyl-2-pentenoic acid, 2-propenoic acid, methyl 2-propenoate, methyl 2-methyl 2-propenoate, methyl 2-butenoate, ethyl 2-hexenoate, isopropyl 2-decenoate, phenyl 2-pentenoate, tertiary butyl 2-propenoate, octadecyl 2-propenoate, dodecyl 2-decenoate, cyclopropyl 2,3-dimethyl-2-butenoate, methyl 3-phenyl-2-propenoate, and the like.

The alpha, beta ethylenically unsaturated carboxylate thioester compounds employed herein have the following formula:

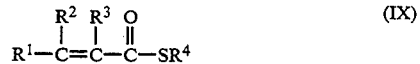
(IX)

wherein $R^1$, $R^2$, $R^3$, and $R^4$ are the same or different and are hydrogen or substituted or unsubstituted hydrocarbyl as defined above. Examples of such alpha, beta-ethylenically unsaturated carboxylate thioesters of formula IX are methylmercapto 2-butenoate, ethylmercapto 2-hexenoate, isopropylmercapto 2-decenoate, phenylmercapto 2-pentenoate, tertiary butylmercapto 2-propenoate, octadecylmercapto 2-propenoate, dodecylmercapto 2-decenoate, cyclopropylmercapto 2,3-dimethyl-2-butenoate, methylmercapto 3-phenyl-2-propenoate, methylmercapto 2-pro-penoate, methylmercapto 2-methyl-2-propenoate, and the like.

The alpha, beta ethylenically unsaturated carboxyamide compounds employed herein have the following formula:

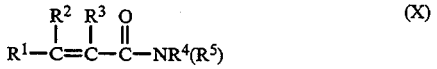
(X)

wherein $R^1$, $R^2$, $R^3$, $R^4$ and $R^5$ are the same or different and are hydrogen or substituted or unsubstituted hydrocarbyl as defined above. Examples of alpha, beta-ethylenically unsaturated carboxyamides of formula X are 2-butenamide, 2-hexenamide, 2-decenamide, 3-methyl-2-heptenamide, 3-methyl-2-butenamide, 3-phenyl-2-propenamide, 3-cyclohexyl-2-butenamide, 2-methyl-2-butenamide, 2-propyl-2-propenamide, 2-isopropyl-2-hexenamide, 2,3-dimethyl-2-butenamide, 3-cyclohexyl-2-methyl-2-pentenamide, N-methyl 2-butenamide, N,N-diethyl 2-hexenamide, N-isopropyl 2-decenamide, N-phenyl 2-pentenamide, N-tertiary butyl 2-propenamide, N-octadecyl 2-propenamide, N-

N-di-dodecyl 2-decenamide, N-cyclopropyl 2,3-dimethyl-2-butenamide, N-methyl 3-phenyl-2-propenamide, 2-propenamide, 2-methyl-2-propenamide, 2-ethyl-2-propenamide and the like.

The alpha, beta ethylenically unsaturated thiocarboxylate compounds employed herein have the following formula:

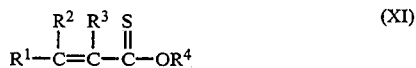 (XI)

wherein $R^1$, $R^2$, $R^3$, and $R^4$ are the same or different and are hydrogen or substituted or unsubstituted hydrocarbyl as defined above. Examples of alpha, beta-ethylenically unsaturated thiocarboxylate compounds of formula XI are 2-butenthioic acid, 2-hexenthioic acid, 2-decenthioic acid, 3-methyl-2-heptenthioic acid, 3-methyl-2-butenthioic acid, 3-phenyl-2-propenthioic acid, 3-cyclohexyl-2-butenthioic acid, 2-methyl-2-butenthioic acid, 2-propyl-2-propenthioic acid, 2-isopropyl-2-hexenthioic acid, 2,3-dimethyl-2-butenthioic acid, 3-cyclohexyl-2-methyl-2-pententhioic acid, 2-propenthioic acid, methyl 2-propenthioate, methyl 2-methyl 2-propenthioate, methyl 2-butenthioate, ethyl 2-hexenthioate, isopropyl 2-decenthioate, phenyl 2-pententhioate, tertiary butyl 2-propenthioate, octadecyl 2-propenthioate, dodecyl 2-decenthioate, cyclopropyl 2,3-dimethyl-2-butenthioate, methyl 3-phenyl-2-propenthioate, and the like.

The alpha, beta ethylenically unsaturated dithioic acid and acid ester compounds employed herein have the following formula:

 (XII)

wherein $R^1$, $R^2$, $R^3$, and $R^4$ are the same or different and are hydrogen or substituted or unsubstituted hydrocarbyl as defined above. Examples of such alpha, beta-ethylenically unsaturated carboxylate compounds of formula VIII are acrylic acid, methacrylic acid, the methyl, ethyl, isopropyl, n-butyl, and isobutyl esters of acrylic and methacrylic acids, 2-butenoic acid, 2-hexenoic acid, 2-decenoic acid, 3-methyl-2-heptenoic acid, 3-methyl-2-butenoic acid, 3-phenyl-2-propenoic acid, 3-cyclohexyl-2-butenoic acid, 2-methyl-2-butenoic acid, 2-propyl-2-propenoic acid, 2-isopropyl-2-hexenoic acid, 2,3-dimethyl-2-butenoic acid, 3-cyclohexyl-2-methyl-2-pentenoic acid, 2-propenoic acid, methyl 2-propenoate, methyl 2-methyl 2-propenoate, methyl 2-butenoate, ethyl 2-hexenoate, isopropyl 2-decenoate, phenyl 2-pentenoate, tertiary butyl 2-propenoate, octadecyl 2-propenoate, dodecyl 2-decenoate, cyclopropyl 2,3-dimethyl-2-butenoate, methyl 3-phenyl-2-propenoate, and the like.

The alpha, beta ethylenically unsaturated carboxylate thioester compounds employed herein have the following formula:

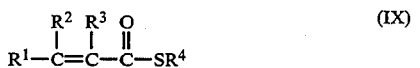 (IX)

wherein $R^1$, $R^2$, $R^3$, and $R^4$ are the same or different and are hydrogen or substituted or unsubstituted hydrocarbyl as defined above. Examples of such alpha, beta-ethylenically unsaturated carboxylate thioesters of formula IX are methylmercapto 2-butenoate, ethylmercapto 2-hexenoate, isopropylmercapto 2-decenoate, phenylmercapto 2-pentenoate, tertiary butylmercapto 2-propenoate, octadecylmercapto 2-propenoate, dodecylmercapto 2-decenoate, cyclopropylmercapto 2,3-dimethyl-2-butenoate, methylmercapto 3-phenyl-2-propenoate, methylmercapto 2-propenoate, methylmercapto 2-methyl-2-propenoate, and the like.

The alpha, beta ethylenically unsaturated carboxyamide compounds employed herein have the following formula:

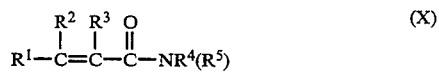 (X)

wherein $R^1$, $R^2$, $R^3$, $R^4$ and $R^5$ are the same or different and are hydrogen or substituted or unsubstituted hydrocarbyl as defined above. Examples of alpha, beta-ethylenically unsaturated carboxyamides of formula X are 2-butenamide, 2-hexenamide, 2-decenamide, 3-methyl-2-heptenamide, 3-methyl-2-butenamide, 3-phenyl-2-propenamide, 3-cyclohexyl-2-butenamide, 2-methyl-2-butenamide, 2-propyl-2-propenamide, 2-isopropyl-2-hexenamide, 2,3-dimethyl-2-butenamide, 3-cyclohexyl-2-methyl-2-pentenamide, N-methyl 2-butenamide, N,N-diethyl 2-hexenamide, N-isopropyl 2-decenamide, N-phenyl 2-pentenamide, N-tertiary butyl 2-propenamide, N-octadecyl 2-propenamide, N-N-didodecyl 2-decenamide, N-cyclopropyl 2,3-dimethyl-2-butenamide, N-methyl 3-phenyl-2-propenamide, 2-propenamide, 2-methyl-2-propenamide, 2-ethyl-2-propenamide and the like.

The alpha, beta ethylenically unsaturated thiocarboxylate compounds employed herein have the following formula:

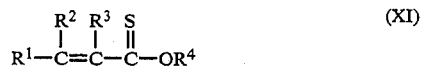 (XI)

wherein $R^1$, $R^2$, $R^3$, and $R^4$ are the same or different and are hydrogen or substituted or unsubstituted hydrocarbyl as defined above. Examples of alpha, beta-ethylenically unsaturated thiocarboxylate compounds of formula XI are 2-butenthioic acid, 2-hexenthioic acid, 2-decenthioic acid, 3-methyl-2-heptenthioic acid, 3-methyl-2-butenthioic acid, 3-phenyl-2-propenthioic acid, 3-cyclohexyl-2-butenthioic acid, 2-methyl-2-butenthioic acid, 2-propyl-2-propenthioic acid, 2-isopropyl-2-hexenthioic acid, 2,3-dimethyl-2-butenthioic acid, 3-cyclohexyl-2-methyl-2-pententhioic acid, 2-propenthioic acid, methyl 2-propenthioate, methyl 2-methyl 2-propenthioate, methyl 2-butenthioate, ethyl 2-hexenthioate, isopropyl 2-decenthioate, phenyl 2-pententhioate, tertiary butyl 2-propenthioate, octadecyl 2-propenthioate, dodecyl 2-decenthioate, cyclopropyl 2,3-dimethyl-2-butenthioate, methyl 3-phenyl-2-propenthioate, and the like.

The alpha, beta ethylenically unsaturated dithioic acid and acid ester compounds employed herein have the following formula:

 (XII)

wherein $R^1$, $R^2$, $R^3$, and $R^4$ are the same or different and are hydrogen or substituted or unsubstituted hydrocarbyl as defined above. Examples of alpha, beta-ethylenically unsaturated dithioic acids and acid esters of formula XII are 2-butendithioic acid, 2-hexendithioic acid, 2-decendithioic acid, 3-methyl-2-heptendithioic acid, 3-methyl-2-butendithioic acid, 3-phenyl-2-propendithioic acid, 3-cyclohexyl-2-butendithioic acid, 2-methyl-2-butendithioic acids 2-propyl-2-propendithioic acid, 2-isopropyl-2-hexendithioic acid, 2,3-dimethyl-2-butendithioic acid, 3-cyclo hexyl-2-methyl-2-pentendithioic acid, 2-propendithioic acid, methyl 2-propendithioate, methyl 2-methyl 2-proendithioate, methyl 2-butendithioate, ethyl 2-hexendithioate, isopropyl 2-decendithioate, phenyl 2-pentendithioate, tertiary butyl 2-propendithioate, 3-methyl-2-butenthioic acid, 3-phenyl-2-propenthioic acid, 3-cyclohexyl-2-butenthioic acid, 2-methyl-2-butenthioic acid, 2-propyl-2-propenthioic acid, 2-isopropyl-2-hex enthioic acid, 2,3-dimethyl-2-butenthioic acid, 3-cyclohexyl-2-methyl-2-pententhioic acid, 2-propenthioic acid, methyl 2-propenthioate, methyl 2-methyl 2-propenthioate, methyl 2-butenthioate, ethyl 2-hexenthioate, isopropyl 2-decenthioate, phenyl 2-pententhioate, tertiary butyl 2-propenthioate, octadecyl 2-propenthioate, dodecyl 2-decenthioate, cyclopropyl 2,3-dimethyl-2-butenthioate, methyl 3-phenyl-2-propenthioate, and the like.

The alpha, beta ethylenically unsaturated dithioic acid and acid ester compounds employed herein have the following formula:

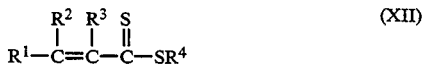

(XII)

wherein $R^1$, $R^2$, $R^3$, and $R^4$ are the same or different and are hydrogen or substituted or unsubstituted hydrocarbyl as defined above. Examples of alpha, beta-ethylenically unsaturated dithioic acids and acid esters of formula XII are 2-butendithioic acid, 2-hexendithioic acid, 2-decendithioic acid, 3-methyl-2-heptendithioic acid, 3-methyl-2-butendithioic acid, 3-phenyl-2-propendithioic acid, 3-cyclohexyl-2-butendithioic acid, 2-methyl-2-butendithioic acid, 2-propyl-2-propendithioic acid, 2-isopropyl-2-hexendithioic acid, 2,3-dimethyl-2-butendithioic acid, 3-cyclohexyl-2-methyl-2-pentendithioic acid, 2-propendithioic acid, methyl 2-propendithioate, methyl 2-methyl 2-proendithioate, methyl 2-butendithioate, ethyl 2-hexendithioate, isopropyl 2-decendithioate, phenyl 2-pentendithioate, tertiary butyl 2-propendithioate, octadecyl 2-propendithioate, dodecyl 2-decendithioate, cyclopropyl 2,3-dimethyl-2-butendithioate, methyl 3-phenyl-2-propendithioate, and the like.

The alpha, beta ethylenically unsaturated thiocarboxyamide compounds employed herein have the following formula:

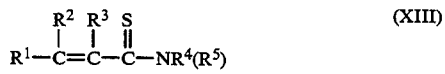

(XIII)

wherein $R^1$, $R^2$, $R^3$, $R^4$ and $R^5$ are the same or different and are hydrogen or substituted or unsubstituted hydrocarbyl as defined above. Examples of alpha, beta-ethylenically unsaturated thiocarboxyamides of formula XIII are 2-butenthioamide, 2-hexenthioamide, 2-decenthioamide, 3-methyl-2-heptenthioamide, 3-methyl-2-butenthioamide, 3-phenyl-2-propenthioamide, 3-cyclohexyl-2-butenthioamide, 2-methyl-2-butenthioamide, 2-propyl-2-propenthioamide, 2-isopropyl-2-hexenthioamide, 2,3-dimethyl-2-butenthioamide, 3-cyclohexyl-2-methyl-2-pententhioamide, N-methyl 2-butenthioamide, N,N-diethyl 2-hexenthioamide, N-isopropyl 2-decenthioamide, N-phenyl 2-pententhioamide, N-tertiary butyl 2-propenthioamide, N-octadecyl 2-propenthioamide, N-N-didodecyl 2-decenthioamide, N-cyclopropyl 2,3-dimethyl-2-butenthioamide, N-methyl 3-phenyl-2-propenthioamide, 2-propenthioamide, 2-methyl-2-propenthioamide, 2-ethyl-2-propenthioamide and the like.

Preferred compounds for reaction with the polyamines in accordance with this invention are lower alkyl esters of acrylic and (lower alkyl) substituted acrylic acid. Illustrative of such preferred compounds are compounds of the formula:

(XIV)

where $R^3$ is hydrogen or a $C_1$ to $C_4$ alkyl group, such as methyl, and $R^4$ is hydrogen or a $C_1$ to $C_4$ alkyl group, capable of being removed so as to form an amido group, for example, methyl, ethyl, propyl, isopropyl, butyl, sec-butyl, tert-butyl, aryl, hexyl, etc. In the preferred embodiments these compounds are acrylic and methacrylic esters such as methyl, ethyl or propyl acrylate, methyl, ethyl or propyl methacrylate. When the selected alpha, beta-unsaturated compound comprises a compound of formula I wherein X is oxygen, the resulting reaction product with the polyamine contains at least one amido linkage (—C(O)N<) and such materials are herein termed "amido-amines." Similarly, when the selected alpha, beta unsaturated compound of formula I comprises a compound wherein X is sulfur, the resulting reaction product with the polyamine contains thioamide linkage (—C(S)N<) and these materials are herein termed "thioamido-amines." For convenience, the following discussion is directed to the preparation and use of amido-amines, although it will be understood that such discussion is also applicable to the thioamido-amines.

The type of amido-amine formed varies with reaction conditions. For example, a more linear amido-amine is formed where substantially equimolar amounts of the unsaturated carboxylate and polyamine are reacted. The presence of excesses of the ethylenically unsaturated reactant of formula I tends to yield an amido-amine which is more cross-linked than that obtained where substantially equimolar amounts of reactants are employed. Where for economic or other reasons a cross-linked amido-amine using excess amine is desired, generally a molar excess of the ethylenically unsaturated reactant of about at least 10%, such as 10–300%, or greater, for example, 25–200%, is employed. For more efficient cross-linking an excess of carboxylated material should preferably be used since a cleaner reaction ensues. For example, a molar excess of about 10–100% or greater such as 10–50% but preferably an excess of 30–50% of the carboxylated material. Larger excess can be employed if desired.

In summary, without considering other factors, equimolar amounts of reactants tend to produce a more linear amido-amine whereas excess of the formula I reactant tends to yield a more cross-linked amidoamine. It should be noted that the higher the polyamine (i.e., in greater the number of amino groups on the molecule) the greater the statistical probability of cross-linking since, for example, a tetraalkylenepentamine, such as tetraethylene pentamine

as more labile hydrogens than ethylene diamine.

These amido-amine adducts so formed are characterized by both amido and amino groups. In their simplest embodiments they may be represented by units of the following idealized formula:

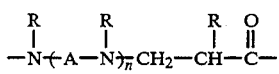

wherein the R's, which may be the same or different, are hydrogen or a substituted group, such as a hydrocarbon group, for example, alkyl, alkenyl, alkynyl, aryl, etc., and A is a moiety of the polyamine which, for example, may be aryl, cycloalkyl, alkyl, etc., and n is an integer such as 1-10 or greater. The amido-amine adducts preferably contain an average of form 1 to 3 amido groups per molecule of the amido-amine adduct.

The above simplified formula represents a linear amido-amine polymer. However, cross-linked polymers may also be formed by employing certain conditions since the polymer has labile hydrogens which can further react with either the unsaturated moiety by adding across the double bond or by amidifying with a carboxylate group.

Preferably, however, the amido-amines of this invention are not cross-linked to any substantial degree, and more preferably are substantially linear.

Preferably, the polyamine reactant contains at least one primary amine (and more preferably from 2 to 4 primary amines) group per molecule, and the polyamine and the unsaturated reactant of formula I are contacted in an amount of from about 1 to 10, more preferably from about 2 to 6, and most preferably from about 3 to 5, equivalents of primary amine in the polyamine reactant per mole of the unsaturated reactant of formula I.

The reaction between the selected polyamine and acrylate-type compound is carried out at any suitable temperature. Temperatures up to the decomposition points of reactants and products can be employed. In practice, one generally carries out the reaction by heating the reactants below 100° C., such as 80°-90° C., for a suitable period of time, such as a few hours. Where an acrylic-type ester is employed, the progress of the reaction can be judged by the removal of the alcohol in forming the amide. During the early part of the reaction alcohol is removed quite readily below 100° C. in the case of low boiling alcohols such as methanol or ethanol. As the reaction slows, the temperature is raised to push the polymerization to completion and the temperature may be raised to 150° C. toward the end of the reaction. Removal of alcohol is a convenient method of judging the progress and completion of the reaction which is generally continued until no more alcohol is evolved. Based on removal of alcohol, the yields are generally stoichiometric. In more difficult reactions, yield of at least 95% are generally obtained.

Similarly, it will be understood that the reaction of an ethylenically unsaturated carboxylate thioester of formula IX liberates the corresponding $HSR^4$ compound (e.g., $H_2S$ when $R^4$ is hydrogen) as a by-product, and the reaction of an ethylenically unsaturated carboxyamide of formula X liberates the corresponding $HNR^4(R^5)$ compound (e.g., ammonia when $R^4$ and $R^5$ are each hydrogen) as by-product.

The reaction time involved can vary widely depending on a wide variety of factors. For example, there is a relationship between time and temperature. In general, lower temperature demands longer times. Usually, reaction times of from about 2 to 30 hours, such as 5 to 25 hours, and preferably 3 to 10 hours will be employed.

Although one can employ a solvent, the reaction can be run without the use of any solvent. In fact, where a high degree of cross-linking is desired, it is preferably to avoid the use of a solvent and most particularly to avoid a polar solvent such as water. However, taking into consideration the effect of solvent on the reaction, where desired, any suitable solvent can be employed, whether organic or inorganic, polar or non-polar.

As an example of the amido-amine adducts, the reaction of tetraethylene pentaamine (TEPA) with methyl acrylate can be illustrated as follows:

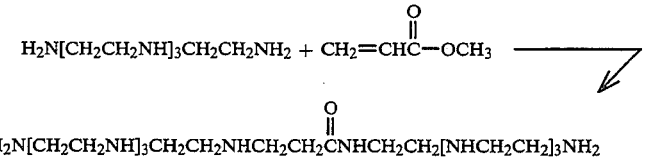

REACTION OF GRAFTED DEGRADED ETHYLENE COPOLYMER WITH AMIDO AMINE

The grafted degraded ethylene copolymer, preferably in solution, such as an oil solution, containing 5 to 95 wt. %, preferably 5 to 30 wt. %, and more preferably 10 to 20 wt. % of said grafted degraded ethylene copolymer, is readily reacted with the amido-amine by introducing the amido amine into said grafted degraded ethylene copolymer containing solution and heating at a temperature of from about 100° C. to 250° C., preferably from 125° to 175° C., for from about 0.1 to about 10 hours, usually about 0.2 to about 6 hours. The heating is preferably carried out, in the case of degraded ethylene copolymer substituted dicarboxylic acid material, to favor formation of imides or mixtures of imides and amides rather than amides and salts. In the case of degraded ethylene copolymer substituted monocarboxylic acid material heating is preferably carried out to favor formation of amides rather than salts. Removal of water assures completion of the imidation/amidation reaction. Reaction ratios can vary considerably, depending upon the reactants, amounts of excess, type of bonds formed, etc. Generally, from about 0.8 to about 1.2, preferably from about 0.9 to about 1.1 moles of ethylene copolymer substituted monocarboxylic or dicarboxylic acid moiety content, e.g., grafted succinic anhydride content, is used per equivalent of amido amine reactant, e.g., amine.

An example of the reaction of an amido-amine reactant with degraded ethylene copolymer substituted dicarboxylic acid material is the reaction of degraded ethylene-propylene copolymer substituted succinic anhydride (EPSA) with a poly amido-amine having two terminal —NH$_2$ groups, which can be illustrated as follows:

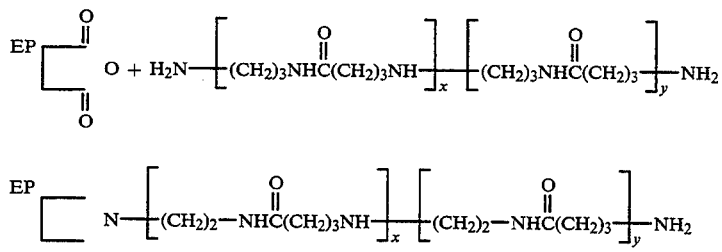

wherein x and y are each integers of from 0 to 10, with the proviso that the sum of x+y is at least 1, e.g., 1 to 20.

An example of the reaction of an amido-amine reactant with a degraded ethylene copolymer substituted monocarboxylic acid material is the reaction of degraded ethylene-propylene copolymer substituted propionic acid (EPA) with a poly amido-amine having two terminal —NH$_2$ groups, which can be illustrates as follows:

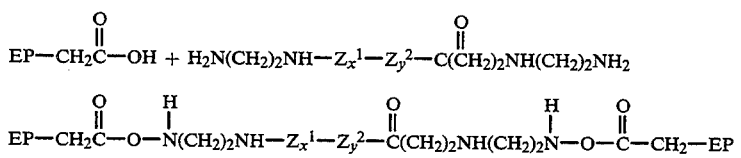

wherein x and y are each integers of from 0 to 10, with the proviso that the sum of x+y is at least 1, e.g., 1 to 20 and wherein $Z^1$ and $Z^2$ are the same or different and are each moieties of the formula:

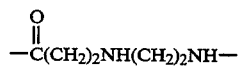

It will be understood that the amido-amine reactant can be employed alone or in admixture with any of the above described amines, such as the polyalkylene polyamines, useful in preparing the amido-amine reactant.

Preferably, the degraded ethylene copolymer substituted mono- or dicarboxylic acid material and amido-amine will be contacted for a time and under conditions sufficient to react substantially all of the primary nitrogens in the amido-amine reactant. The progress of this reaction can be followed by infra-red analysis.

This reaction can be conducted in a polar or non-polar solvent, e.g., xylene, toluene, benzene, and the like, and is preferably conducted in the presence of a mineral or synthetic lubricating oil.

In aspect B of the instant invention the carboxylic acid material grafted degraded ethylene copolymer, e.g., succinic anhydride grafted degraded ethylene-propylene copolymer, is reacted with the amido-amine and the carboxylic acid component which is described more fully hereinafter. In the reaction involving the carboxylic acid material grafted degraded ethylene copolymer, amido-amine, and carboxylic acid component it is generally preferred that a reaction mixture containing said carboxylic acid material grafted degraded ethylene copolymer and said carboxylic acid component be first prepared. This reaction mixture can be readily prepared by admixing the carboxylic acid component and the carboxylic acid material grafted degraded ethylene copolymer. Into this reaction mixture is then introduced the amido-amine. This amido-amine is then reacted with the carboxylic acid material grafted ethylene copolymer and with the carboxylic acid component to form the nitrogen containing carboxylic acid material grafted ethylene copolymer of the instant invention.

Alternatively, the amido-amine and the carboxylic acid component can be added substantially simultaneously or concurrently to the carboxylic acid material grafted degraded ethylene-propylene copolymer to form a reaction mixture. This reaction mixture is then reacted under conditions effective for the three components to react and form the nitrogen containing carboxylic acid material grafted degraded ethylene copolymer of the instant invention.

Furthermore, the carboxylic acid component and the amido-amine may be prereacted, and this prereacted carboxylic acid component/amido-amine may then be coreacted with the carboxylic acid material grafted degraded ethylene copolymer to form the nitrogen containing carboxylic acid material grafted degraded ethylene copolymer of the instant invention.

CARBOXYLIC ACID COMPONENT

The carboxylic acid component includes: hydrocarbyl substituted dicarboxylic acid or anhydride, preferably succinic anhydride or acid, having 12 to 49 carbons, preferably 16 to 49 carbons in said hydrocarbyl group; long chain monocarboxylic acid of the formula $R^{10}COOH$ where $R^{10}$ is a hydrocarbyl group of 50 to 400 carbons; and long chain hydrocarbyl substituted dicarboxylic acid or anhydride, preferably succinic anhydride or acid, having from about 50 to about 400 carbons in said hydro- carbyl group. The preferred carboxylic acid component is the long chain hydrocarbyl substituted dicarboxylic acid or anhydride, preferably succinic acid or anhydride, having from about 50 to about 400 carbon atoms in said hydrocarbyl group. Said hydrocarbyl groups are essentially aliphatic and include alkenyl and alkyl groups. The longer chain acids and anhydrides are preferred, particularly when the grafting reaction is carried out in lubricating oil.

The about $C_{50}$-$C_{400}$ hydrocarbyl subtituted dicarboxylic acid or anhydride includes the reaction product of the $C_{50}$-$C_{400}$ hydrocarbon polymer, generally a polyolefin, with (i) monounsaturated $C_4$ to $C_{10}$ dicarboxylic acid wherein (a) the carboxyl groups are vicinyl, i.e., located on adjacent carbon atoms, and (b) at least one, preferably both, of said adjacent carbon atoms are part of said monounsaturation; or with (ii) derivatives of (i) such as anhydrides of (i). Upon reaction with the hydrocarbon polymer, the monounsaturation of the dicarboxylic acid, anhydride, etc. becomes saturated. Thus for example, maleic anhydride becomes a hydrocarbyl substituted succinic anhydride.

Typically, from about 0.7 to about 4.0 (e.g., 0.8 to 2.6), preferably from about 1.0 to about 2.0, and most preferably from about 1.1 to about 1.7 moles of said unsaturated $C_4$ to $C_{10}$ dicarboxylic acid, anhydride or ester are charged to the reactor per mole of polyolefin charged.

Normally, not all of the polyolefin reacts with the unsaturated acid or derivative and the hydrocarbyl substituted dicarboxylic acid material will contain unreacted polyolefin. The unreacted polyolefin is typically not removed from the reaction mixture (because such removal is difficult and would be commercially infeasible) and the product mixture, stripped of any unreacted monounsaturated $C_4$ to $C_{10}$ dicarboxylic acid or anhydride, is employed as the carboxylic acid component.

Characterization of the average number of moles of dicarboxylic acid or anhydride, which have reacted per mole of polyolefin charged to the reaction (whether it has undergone reaction or not) is defined herein as functionality. Said functionality is based upon (i) determination of the saponification number of the resulting product mixture using potassium hydroxide; and (ii) the number average molecular weight of the polymer charged, using techniques well known in the art. Functionality is defined solely with reference to the resulting product mixture. Although the amount of said reacted polyolefin contained in the resulting product mixture can be subsequently modified, i.e., increased or decreased by techniques known in the art, such modifications do not alter functionality as defined above. The term $C_{50}$-$C_{400}$ hydrocarbyl substituted dicarboxylic acid material is intended to refer to the product mixture whether it has undergone such modification or not.

Accordingly, the functionality of the $C_{50}$-$C_{400}$ hydrocarbyl substituted dicarboxylic acid material will be typically at least about 0.5, preferably at least about 0.8, and most preferably at least about 0.9 and will vary typically from about 0.5 to about 2.8 (e.g., 0.6 to 2), preferably from about 0.8 to about 1.4, and most preferably from about 0.9 to about 1.3.

Exemplary of such unsaturated dicarboxylic acids or anhydrides thereof are fumaric acid, itaconic acid, maleic acid, maleic anhydride, chloromaleic acid, chloromaleic anhydride, etc.

Preferred about $C_{50}$ to about $C_{400}$ olefin polymers for reaction with the unsaturated dicarboxylic acids or derivatives thereof are polymers comprising a major molar amount of $C_2$ to $C_{10}$, e.g., $C_2$ to $C_5$ monoolefin. Such olefins include ethylene, propylene, butylene, isobutylene, pentens, octene-1, styrene, etc. The polymers can be homopolymers such as polyisobutylene, as well as copolymers of two or more of such olefins such as copolymers of: ethylene and propylene; butylene and isobutylene; propylene and isobutylene; etc. Other copolymers include those in which a minor molar amount of the copolymer monomers, e.g., 1 to 10 mole %, is a $C_4$ to $C_{18}$ non-conjugated diolefin, e.g., a copolymer of isobutylene and butadiene; or a copolymer of ethylene, propylene and 1,4-hexadiene; etc.

In some cases, the olefin polymer may be completely saturated, for example an ethylene-propylene copolymer made by a Ziegler-Natta synthesis usig hydrogen as a moderator to control molecular weight.

The olefin polymers used will usually have number average molecular weights within the range of about 700 and about 5,600, more usually between about 800 and about 3000. Particularly useful olefin polymers have number average molecular weights within the range of about 900 and about 2500 with approximately one terminal double bond per polymer chain. An especially useful starting material is polyisobutylene. The number average molecular weight for such polymers can be determined by several known techniques. A convenient method for such determination is by gel permeation chromatography (GPC) which additionally provides molecular weight distribution information, see W. W. Yau, J. J. Kirkland and D. D. Bly, "Modern Size Exclusion Liquid Chromatography", John Wiley and Sons, New York, 1979.

Processes for reacting the about $C_{50}$ to about $C_{400}$ olefin polymer with the $C_{4-10}$ unsaturated dicarboxylic acid or anhydride are known in the art. For example, the olefin polymer and the dicarboxylic acid or derivative may be simply heated together as disclosed in U.S. Pat. Nos. 3,361,673 and 3,401,118 to cause a thermal "ene" reaction to take place. Or, the olefin polymer can be first halogenated, for example, chlorinated or brominated to about 1 to 8 wt. %, preferably 3 to 7 wt. % chlorine, or bromine, based on the weight of polymer, by passing the chlorine or bromine through the polyolefin at a temperature of 60° to 250° C., e.g. 120° to 160° C., for about 0.5 to 10, preferably 1 to 7 hours. The halogenated polymer may then be reacted with sufficient unsaturated acid or derivative at 100° to 250° C., usually about 180° to 235° C., for about 0.5 to 10, e.g. 3 to 8 hours, so the product obtained will contain the desired number of moles of the unsaturated acid or derivative per mole of the halogenated polymer. Processes of this general type are taught in U.S. Pat. Nos. 3,087,936; 3,172,892; 3,272,746 and others.

Alternatively, the olefin polymer, and the unsaturated acid or derivative are mixed and heated while adding chlorine to the hot material. Processes of this type are disclosed in U.S. Pat. Nos. 3,215,707; 3,231,587; 3,912,764; 4,110,349; and in U.K. 1,550,219.

By the use of halogen, about 65 to 95 wt. % of the polyolefin, e.g. polyisobutylene will normally reacted with the dicarboxylic acid or derivative. Upon carrying out a thermal reaction without the use of halogen or a catalyst, then usually only about 50 to 75 wt. % of the polyisobutylene will react. Chlorination helps increased the reactivity.

Particularly preferred as the acid component is polyisobutenyl succinic anhydride.

PRE-REACTED AMIDO AMINE-CARBOXYLIC ACID COMPONENT

The aforesaid amido-amine and carboxylic acid component may be pre-reacted, with the acid being generally attached to the amido-amine through salt, imide, amide, or other linkages so that a primary or secondary amine group of the amido-amine is still available for reaction with the acid moieties of the grafted high molecular weight ethylene copolymer. A convenient source of these pre-reacted materials are the lubricating oil dispersant, provided they retain primary amine groups capable of further reaction with the grafted ethylene copolymer, such as those described in U.S. application Ser. No. 126,405, filed Nov. 30, 1987 and U.S. application Ser. No. 269,461, filed Nov. 10, 1988, both of which are incorporated herein by reference.

The carboxylic acid material grafted degraded ethylene copolymer is reacted with the amido-amine and carboxylic acid component or pre-reacted amido-amine/carboxylic acid component substantially as described hereinafore for the reaction of the carboxylic acid material grafted ethylene copolymer with the amido-amine. Thus, for example a reaction mixture containing the grafted degraded ethylene copolymer, e.g., ethylene-propylene substituted succinic anhydride, and carboxylic acid component, e.g., polyisobutenyl substituted succinic anhydride, is prepared by admixing these two reactants, and the amido-amine is then introduced into this reaction mixture and the reaction is carried out as described hereinafore. Alternatively, the carboxylic acid component and amido-amine may be added substantially simultaneously to a reaction mixture containing the carboxylic acid material grafted degraded ethylene copolymer.

Generally, the amount of the carboxylic acid component utilized is an amount sufficient to provide about 0.5 to about 4, preferably from about 1 to about 2 moles of said carboxylic acid component per molar amount of the carboxylic acid moieties present in the grafted degraded ethylene copolymer. For example, with a grafted degraded ethylene-propylene copolymer of about 40,000 $\overline{M}_n$ and averaging 4 succinic anhydride groups per molecule, about 4 moles of polyisobutenyl succinic anhydride would preferably be used per mole of grafted degraded copolymer. Generally, from about 0.8 to 1.2, preferably from about 0.9 to 1.1 moles of the combined carboxylic acid moiety content of the grafted degraded ethylene copolymer and the carboxylic acid component are used per equivalent of amido-amine reactant, e.g., amine.

Under certain conditions, particularly upon storage, oleaginous compositions, particularly oil concentrates, containing the multifunctional viscosity index improver additives of the instant invention may exhibit an increase in viscosity. This viscosity increase appears to be due, at least in part, to chain extension and/or cross-linking of the nitrogen containing grafted degraded ethylene copolymer of the instant invention. In order to stabilize the viscosity and retard or inhibit said viscosity increase of these oil compositions the nitrogen containing grafted degraded ethylene copolymers of the instant invention can be treated or post-reacted with a variety of materials, particularly acid materials, to inactivate some of the remaining reactive amino groups, i.e., secondary amino groups or primary amino groups. This treatment inhibits, diminishes, or retards chain-extension and/or crosslinking of the nitrogen containing grafted degraded ethylene copolymer. The amount of remaining unreacted reactive amino groups which are inactivated is an amount which is effective to inhibit or retard chain extension and/or cross-linking of the nitrogen containing grafted degraded ethylene copolymer. Thus, for example, the nitrogen containing acid material grafted degraded ethylene copolymer may be reacted or post-treated with $C_1-C_{30}$ monocarboxylic acids or anhydrides, preferably acetic anhydride, or unsubstituted or $C_1$ to $C_{28}$ hydrocarbyl substituted dicarboxylic acid anhydrides as disclosed in U.S. Pat. No. 4,137,185, incorporated herein by reference; the sulfonic acids of U.S. Pat. No. 4,144,181, incorporated herein by reference; and the $C_{12}$ to $C_{18}$ hydrocarbyl substituted dicarboxylic anhydrides, preferably $C_{12}$ to $C_{18}$ hydrocarbyl substituted succinic anhydride, of U.S. Pat. No. 4,803,003, incorporated herein by reference.

Preferred viscosity stabilizing materials are those disclosed in U.S. Pat. No. 4,803,003, i.e., the $C_{12}$ to about $C_{18}$ hydrocarbyl substituted dicarboxylic anhydrides. These anhydrides may be represented by the general formula $R^{11}Y$ wherein $R^{11}$ is a hydrocarbyl group containing a total of from 12 to about 18, preferably 12 to 16, more preferably 12 to 14, and most preferably 12 carbons, which are essentially aliphatic, saturated or unsaturated, and include alkenyl groups, alkyl groups, and mixtures of alkenyl groups and alkyl groups, preferably alkenyl groups, and can be straight chain or branched, and Y is a dicarboxylic anhydride moiety. When $R^{11}$ is an alkenyl group it is preferred that the olefinic unsaturation site be located near the anhydride, e.g., allylic to Y, moiety. The radical Y will usually contain 4 to 10, preferably 4 to 8, more preferably 4 to 6, and most preferably 4 carbon atoms and will define a dicarboxylic anhydride. The Y radical may be represented by the formula

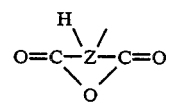

wherein Z is selected from alkylene and alkenylene radicals containing from 2 to 8, preferably 2 to 6, more preferably to 4, and most preferably 2 carbon atoms. Preferably Z is an alkylene radical. The most preferred Y radical is the succinic anhydride radical, i.e.,

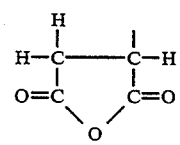

The Y radical is linked to the $R^{11}$ group by a carbon to carbon linkage.

The amount of the hydrocarbyl substituted dicarboxylic anhydride utilized is a viscosity stabilizing effective amount. By viscosity stabilizing effective amount is meant any amount which is effective to stabilize the viscosity of an oleaginous solution of the nitrogen containing acid material grafted ethylene copolymers, i.e., inhibit or retard the increase in viscosity over an extended period of time of an oil solution, particularly an oil concentrate, of the nitrogen containing grafted degraded ethylene copolymers. Generally this amount is from about 0.5–2.5, preferably 1–1.5 moles of $C_{12}$ to about $C_{18}$ hydrocarbyl substituted dicarboxylic anhydride per mole of any remaining primary or secondary amino groups of the degraded ethylene copolymer grafted with a carboxylic acid material and thereafter reacted with the amido-amine.

The chain extension termination or end-capping of the nitrogen containing grafted degraded ethylene copolymer which was preferentially prepared in a mineral oil solution can be conducted by subsequently introducing the $C_{12}$ to about $C_{18}$ hydrocarbyl substituted dicarboxylic anhydride directly into the reaction system used to prepare said nitrogen containing grafted degraded ethylene copolymer, or it can be a separate non-integrated reaction step. Generally, the nitrogen containing carboxylic acid material grafted degraded ethylene copolymer is first produced by preparing the grafted degraded ethylene copolymer and then reacting this grafted degraded copolymer with at least one amido-amine, or with the carboxylic acid component and amido-amine, or with the preformed carboxylic acid component and amido-amine, and this nitrogen containing grafted degraded ethylene copolymer is then subsequently reacted or treated with the $C_{12}$ to about $C_{18}$ hydrocarbyl substituted dicarboxylic anhydride in a end-capping or chain extension limiting step. A viscosity stabilizing effective amount of the $C_{12}$ to about $C_{18}$ hydrocarbyl substituted dicarboxylic anhydride is introduced into the heated solution containing the nitrogen containing grafted degraded ethylene copolymer and the reaction carried on for a period of about 0.1 to 4 hours at a temperature of about 100° to 200° C. In order to fully complete the reaction, it is generally useful to utilize a slight excess, i.e., about 1 to 30, more usually about 1 to 10, percent by weight of the $C_{12}$ to about $C_{18}$ hydrocarbyl substituted dicarboxylic anhydride. The entire reaction is generally carried out under an inert atmosphere, for example, a nitrogen blanket.

This reaction can be conducted in a polar or non-polar solvent, e.g., xylene, toluene, benzene, and the like, and is preferably conducted in the presence of a mineral or synthetic lubricating oil.

Alternatively, at least a portion of the $C_{12}$ to $C_{18}$ hydrocarbyl substituted dicarboxylic anhydride or other end-capping agent can be introduced into a reaction mixture containing the carboxylic acid material grafted degraded ethylene copolymer prior to or concurrently with the introduction of the amido-amine reactant, and the remaining portion of the end-capping agent can be reacted with the preformed, partially end-capped nitrogen containing grafted degraded ethylene copolymer.

The nitrogen containing grafted degraded ethylene copolymers, i.e., the derivatized degraded ethylene copolymers, of the instant invention, either unreacted or reacted with the viscosity stabilizing or end-capping agents described hereinafore, may optionally be post-treated by contacting said nitrogen containing acid material grafted degraded ethylene copolymer with one or more post-treating reagents selected from the group consisting of boron oxide, boron oxide hydrate, boron halides, boron acids, esters of boron acids, carbon disulfide, sulfur, sulfur chlorides, alkenyl cyanides, aldehydes, ketones, urea, thio-urea, guanidine, dicyanodiamide, hydrocarbyl phosphates, hydrocarbyl phosphites, hydrocarbyl thiophosphates, hydrocarbyl thiophosphites, phosphorus sulfides, phosphorus oxides, phosphoric acid, hydrocarbyl thiocyanates, hydrocarbyl isocyanates, hydrocarbyl isothiocyantes, epoxides, episulfides, formaldehyde or formaldehyde-producing compounds plus phenols, and sulfur plus phenols.

Since post-treating processes involving the use of these post-treating reagents are known insofar as application to reaction products of high molecular weight carboxylic acid acylating agents of the prior disclosures and amines and/or alcohols, detailed descriptions of these processes herein is unnecessary. In order to apply these processes to the compositions of this invention, all that is necessary is that reaction conditions, ratio of reactants, and the like as described in these prior disclosure processes, be applied to the novel compositions of this invention. The following U.S. patents are expressly incorporated herein by reference for their disclosure of post-treating processes and post-treating reagents applicable to the compositions of this invention: U.S. Pat. Nos. 3,087,936; 3,200,107; 3,254,025; 3,256,185; 3,278,550; 3,281,428; 3,282,955; 3,284,410; 3,338,832; 3,344,069; 3,366,569; 3,373,111; 3,367,943; 3,403,102; 3,428,561; 3,502,677; 3,513,093; 3,533,945; 3,541,012 (use of acidified clays in post-treating carboxylic derivative compositions derived from the acrylating reagents of this invention and amines); U.S. Pat. Nos. 3,639,242; 3,708,522; 3,859,318; 3,865,813; 3,470,098; 3,369,021; 3,184,411; 3,185,645; 3,245,908; 3,245,909; 3,245,910; 3,573,205; 3,692,681; 3,749,695; 3,865,740; 3,954,639; 3,458,530; 3,390,086; 3,367,943; 3,185,704; 3,551,466; 3,415,750; 3,312,619; 3,280,034; 3,718,663; 3,652,616; UK Pat. No. 1,085,903; UK Pat. NO. 1,162,436; U.S. Pat. No. 3,558,743. The processes of these incorporated patents, as applied to the compositions of this invention, and the post-treated compositions thus produced constitute a further aspect of this invention.

A minor amount, e.g. 0.01 up to 49 wt %, preferably 0.05 to 25 wt. %, based on the weight of the total composition, of the multifunctional viscosity index improvers, e.g., V.I. improver-dispersants, produced in accordance with this invention can be incorporated into a major amount of an oleaginous material, such as a lubricating oil or hydrocarbon fuel, depending upon whether one is forming finished products or additive concentrates. When used in lubricating oil compositions, e.g. automotive or diesel crankcase lubricating oil, derivatized copolymer concentrations are usually within the range of about 0.01 to 25 wt %, of the total composition. The lubricating oils to which the products of this invention can be added include not only hydrocarbon oil derived from petroleum, but also include synthetic lubricating oils such as esters of dibasic acids; complex esters made by esterifications of monobasic acids, polyglycols, dibasic acids and alcohols; polyolefin oils, etc.

The nitrogen containing acid material grafted degraded ethylene copolymer of the invention may be utilized in a concentrate form, e.g., from about 5 wt % up to about 49 wt. %, preferably 7 to 25 wt. %, in oil, e.g., mineral lubricating oil, for ease of handling, and may be prepared in this form by carrying out the reaction of the invention in oil as previously discussed.

The above oil compositions may optionally contain other conventional additives, pour point depressants, antiwear agents, antioxidants, other viscosity-index improvers, dispersants, corrosion inhibitors, anti-foaming agents, detergents, rust inhibitors, friction modifiers, and the like.

Corrosion inhibitors, also known as anti-corrosive agents, reduce the degradation of the metallic parts contacted by the lubricating oil composition. Illustrative of corrosion inhibitors are phosphosulfurized hydrocarbons and the products obtained by reaction of a phosphosulfurized hydrocarbon with an alkaline earth metal oxide or hydroxide, preferably in the presence of an alkylated phenol or of an alkylphenol thioester, and also preferably in the presence of carbon dioxide. Phosphosulfurized hydrocarbons are prepared by reacting a suitable hydrocarbon such as a terpene, a heavy petroleum fraction of a $C_2$ to $C_6$ olefin polymer such as polyisobutylene, with from 5 to 30 wt. % of a sulfide of phosphorus for ½ to 15 hours, at a temperature in the range of about 66° to about 316° C. Neutralization of the phosphosulfurized hydrocarbon may be effected in the manner taught in U.S. Pat. No. 1,969,324.

Oxidation inhibitors, or antioxidants, reduce the tendency of mineral oils to deteriorate in service which deterioration can be evidenced by the products of oxidation such as sludge and varnish-like deposits on the metal surfaces, and by viscosity growth. Such oxidation inhibitors include alkaline earth metal salts of alkylphenolthioesters having preferably $C_5$ to $C_{12}$ alkyl side chains, e.g., calcium nonylphenol sulfide, barium toctylphenyl sulfide, dioctylphenylamine, phenylalphanaphthylamine, phospho- sulfurized or sulfurized hydrocarbons, etc.

Other oxidation inhibitors or antioxidants useful in this invention comprise oil-soluble copper compounds. The copper may be blended into the oil as any suitable oil-soluble copper compound. By oil soluble it is meant that the compound is oil soluble under normal blending conditions in the oil or additive package. The copper compound may be in the cuprous or cupric form. The copper may be in the form of the copper dihydrocarbyl thio- or dithio-phosphates. Alternatively, the copper may be added as the copper salt of a synthetic or natural carboxylic acid. Examples of same thus include $C_{10}$ to $C_{18}$ fatty acids, such as stearic or palmitic acid, but unsaturated acids such as oleic or branched carboxylic acids such as napthenic acids of molecular weights of from about 200 to 500, or synthetic carboxylic acids, are preferred, because of the improved handling and solubility properties of the resulting copper carboxylates. Also useful are oil-soluble copper dithiocarbamates of the general formula $(RR,NCSS)nCu$ (where n is 1 or 2 and R and R, are the same or different hydrocarbyl radicals containing from 1 to 18, and preferably 2 to 12, carbon atoms, and including radicals such as alkyl, alkenyl, aryl, aralkyl, alkaryl and cycloaliphatic radicals. Particularly preferred as R and R, groups are alkyl groups of from 2 to 8 carbon atoms. Thus, the radicals may, for example, be ethyl, n-propyl, i-propyl, n-butyl, i-butyl, sec-butyl, amyl, n-hexyl, i-hexyl, n-heptyl, n-octyl, decyl, dodecyl, octadecyl, 2-ethylhexyl, phenyl, butylphenyl, cyclohexyl, methylcyclopentyl, propenyl, butenyl, etc. In order to obtain oil solubility, the total number of carbon atoms (i.e., R and R,) will generally be about 5 or greater. Copper sulphonates, phenates, and acetylacetonates may also be used.

Exemplary of useful copper compounds are copper CuI and/or CuII salts of alkenyl succinic acids or anhydrides. The salts themselves may be basic, neutral or acidic. They may be formed by reacting (a) polyalkylene succinimides (having polymer groups of $\overline{M}_n$ of 700 to 5,000) derived from polyalkylene-polyamines, which have at least one free carboxylic acid group, with (b) a reactive metal compound. Suitable reactive metal compounds include those such as cupric or cuprous hydroxides, oxides, acetates, borates, and carbonates or basic copper carbonate.

Examples of these metal salts are Cu salts of polyisobutenyl succinic anhydride, and Cu salts of polyisobutenyl succinic acid. Preferably, the selected metal employed is its divalent form, e.g., Cu+2. The preferred substrates are polyalkenyl succinic acids in which the alkenyl group has a molecular weight greater than about 700. The alkenyl group desirably has a $\overline{M}_n$ from about 900 to 1,400, and up to 2,500, with a $\overline{M}_n$ of about 950 being most preferred. Especially preferred is polyisobutylene succinic anhydride or acid. These materials may desirably be dissolved in a solvent, such as a mineral oil, and heated in the presence of a water solution (or slurry) of the metal bearing material. Heating may take place between 70° and about 200° C. Temperatures of 110° C. to 140° C. are entirely adequate. It may be necessary, depending upon the salt produced, not to allow the reaction to remain at a temperature above about 140° C. for an extended period of time, e.g., longer than 5 hours, or decomposition of the salt may occur.

The copper antioxidants (e.g., Cu-polyisobutenyl succinic anhydride, Cu-oleate, or mixtures thereof) will be generally employed in an amount of from about 50 to 500 ppm by weight of the metal, in the final lubricating or fuel composition.

Friction modifiers serve to impart the proper friction characteristics to lubricating oil compositions such as automatic transmission fluids.

Representative examples of suitable friction modifiers are found in U.S. Pat. No. 3,933,659 which discloses fatty acid esters and amides; U.S. Pat. No. 4,176,074 which describes molybdenum complexes of polyisobutenyl succinic anhydride-amino alkanols; U.S. Pat. No. 4,105,571 which discloses glycerol esters of dimerized fatty acids; U.S. Pat. No. 3,779,928 which discloses alkane phosphonic acid salts; U.S. Pat. No. 3,778,375 which discloses reaction products of a phosphonate with an oleamide; U.S. Pat. No. 3,852,205 which discloses S-carboxyalkylene hydrocarbyl succinimide, S-carboxyalkylene hydrocarbyl succinamic acid and mixtures thereof; U.S. Pat. No. 3,879,306 which discloses N(hydroxyalkyl)alkenyl-succinamic acids or succinimides; U.S. Pat. No. 3,932,290 which discloses reaction products of di- (lower alkyl) phosphites and epoxides; and U.S. Pat. No. 4,028,258 which discloses the alkylene oxide adduct of phosphosulfurized N-(hydroxyalkyl) alkenyl succinimides. The disclosures of the above references are herein incorporated by reference. The most preferred friction modifiers are succinate esters, or metal salts thereof, of hydrocarbyl substituted succinic acids or anhydrides and thiobis-alkanols such as described in U.S. Pat. No. 4,344,853.

Dispersants maintain oil insolubles, resulting from oxidation during use, in suspension in the fluid thus preventing sludge flocculation and precipitation or deposition on metal parts. Suitable dispersants include high molecular weight alkyl succinimides, the reaction product of oil-soluble polyisobutylene succinic anhydride with ethylene amines such as tetraethylene pentamine and borated salts thereof.

Pour point depressants, otherwise known as lube oil flow improvers, lower the temperature at which the fluid will flow or can be poured. Such additives are well known. Typically of those additives which usefully optimize the low temperature fluidity of the fluid are $C_8$–$C_{18}$ dialkylfumarate vinyl acetate copolymers, polymethacrylates, and wax naphthalene. Foam control can be provided by an antifoamant of the polysiloxane type, e.g., silicone oil and polydimethyl siloxane.

Anti-wear agents, as their name implies, reduce wear of metal parts. Representatives of conventional antiwear agents are zinc dialkyldithiophosphate and zinc diaryldithiosphate.

Detergents and metal rust inhibitors include the metal salts of sulphonic acids, alkyl phenols, sulfurized alkyl phenols, alkyl salicylates, naphthenates and other oil soluble mono- and dicarboxylic acids. Highly basic (viz, overbased) metal sales, such as highly basic alkaline earth metal sulfonates (especially Ca and Mg salts) are frequently used as detergents. Representative examples of such materials, and their methods of preparation, are found disclosure of which is hereby incorporated by reference.

Some of these numerous additives can provide a multiplicity of effects, e.g., a dispersant-oxidation inhibitor. This approach is well known and need not be further elaborated herein.

Compositions when containing these conventional additives are typically blended into the base oil in amounts which are effective to provide their normal attendant function. Representative effective amounts of such additives are illustrated as follows:

| Additive | Wt. % a.i. (Broad) | Wt. % a.i. (Preferred) |
| --- | --- | --- |
| Viscosity Modifier | .01–12 | .01–4 |
| Corrosion Inhibitor | 0.01–5 | .01–1.5 |
| Oxidation Inhibitor | 0.01–5 | .01–1.5 |
| Dispersant | 0.1–20 | 0.1–8 |
| Pour Point Depressant | 0.01–5 | .01–1.5 |
| Anti-Foaming Agents | 0.001–3 | .001–0.15 |
| Anti-Wear Agents | 0.001–5 | .001–1.5 |
| Friction Modifiers | 0.01–5 | .01–1.5 |
| Detergents/Rust Inhibitors | .01–10 | .01–3 |
| Mineral Oil Base | Balance | Balance |

When other additives are employed, it may be desirable, although not necessary, to prepare additive concentrates comprising concentrated solutions or dispersions of the multifunctional viscosity index improvers of the instant invention (in concentrate amounts hereinabove described), together with one or more of said other additives (said concentrate when constituting an additive mixture being referred to here in as an additive package) whereby several additives can be added simultaneously to the base oil to form the lubricating oil composition. Dissolution of the additive concentrate into the lubricating oil may be facilitated by solvents and by mixing accompanied with mild heating, but this is not essential. The concentrate or additive-package will typically be formulated to contain the multifunctional viscosity index improver additive and optional additional additives in proper amounts to provide the desired concentration in the final formulation when the additive-package is combined with a predetermined amount of base lubricant. Thus, the products of the present invention can be added to small amounts of base oil or other compatible solvents along with other desirable additives to form additive-packages containing active ingredients in collective amounts of typically from about 2.5 to about 90%, and preferably from about 5 to about 75%, and most preferably from about 8 to about 50% by weight additives in the appropriate proportions with the remainder being base oil.

The final formulations may employ typically about 10 wt. % of the additive-package with the remainder being base oil.

All of said weight percents expressed herein are based on active ingredient (a.i.) content of the additive, and/or upon the total weight of any additive-package, or formulation which will be the sum of the a.i. weight of each additive plus the weight of total oil or diluent.

As mentioned hereinafore, the nitrogen containing acid material grafted degraded ethylene copolymers of the present invention are particularly useful as fuel and lubricating oil additives.

The nitrogen containing grafted degraded ethylene copolymers of this invention find their primary utility, however, in lubricating oil compositions, which employ a base oil in which these copolymers are dissolved or dispersed.

Thus, base oils suitable for use in preparing the lubricating compositions of the present invention include those conventionally employed as crankcase lubricating oils for spark-ignited and compression-ignited internal combustion engines, such as automobile and truck engines, marine and railroad diesel engines, and the like. Advantageous results are also achieved by employing the additives of the present invention in base oils conventionally employed in and/or adapted for use as power transmitting fluids such as automatic transmission fluids, tractor fluids, universal tractor fluids and hydraulic fluids, heavy duty hydraulic fluids, power steering fluids and the like. Gear lubricants, industrial oils, pump oils and other lubricating oil compositions can also benefit from the incorporation therein of the additives of the present invention.

Thus, the additives of the present invention may be suitably incorporated into synthetic base oils such as alkyl esters of dicarboxylic acids, polyglycols and alcohols; polyalpha-olefins, polybutenes, alkyl benzenes, organic esters of phosphoric acids, polysilicone oils, etc.

The nitrogen containing carboxylic acid material grafted degraded ethylene copolymers of the instant invention are oil-soluble, dissolvable in oil with the aid of a suitable solvent, or are stably dispersible therein. The terms oil-soluble, dissolvable in oil, or stably dispersible in oil as that terminology is used herein does not necessarily indicate that the materials are soluble, dissolvable, miscible, or capable of being suspended in oil in all proportions. It does mean, however, that the additives for instance, are soluble or stably dispersible in oil to an extent sufficient to exert their intended effect in the environment in which the oil is employed. Moreover, the additional incorporation of other additives may also permit incorporation of higher levels of a particular copolymer hereof, if desired.

Accordingly, while any effective amount, i.e., viscosity index improving or viscosity index improving-dispersant effective amount, of the additives of the present invention can be incorporated into the fully formulated lubricating oil composition, it is contemplated that such effective amount be sufficient to provide said lube oil composition with an amount of the additive of typically from about 0.001 to about 20, preferably about 0.01 to about 15, more preferably from about 0.1 to about 10, and most preferably from about 0.25 to about 5.0 wt. %, based on the weight of said composition.

The following examples are presented to further illustrate the instant invention. These examples are presented by way of illustration and do not limit the instant invention thereto. Unless otherwise indicated all parts and percentages are parts and percentages are by weight.

Example 1 illustrates the preparation of an amidoamine of the instant invention.

EXAMPLE 1

Into a 500 ml. four neck reaction flask, fitted with a stirrer, thermometer and addition funnel are charged 158 grams (2.63 mole) of ethylenediamine. Nitrogen is introduced into the flask to provide a nitrogen blanket. 113.23 grams (1.32 mole) of methyl acrylate are added slowly via the addition funnel so as to keep the temperature of the reaction mixture below 40° C. After addition of the methyl acrylate is complete the reaction mixture is stirred for one hour. The temperature is then raised to 100° C. and the reaction mixture is kept at this temperature for 3 hours. The reaction mixture is then allowed to cool to 40° C. The reaction mixture is stripped to remove methanol byproduct. The reaction mixture is then heated at 110° C. for one hour. The reaction mixture is then allowed to cool to 50° C. and is stripped for 1½ hours.

Example 2 illustrates the preparation of a nitrogen containing succinic anhydride grafted degraded ethylene-propylene copolymer of the instant invention.

EXAMPLE 2

An ethylene-propylene copolymer having an ethylene content of about 56 wt. %, a thickening efficiency (T.E.) of about 2.4, a SSI of about 25%, an $\overline{M}_w$ of about 134,000, an $\overline{M}_n$ of about 82,000 a $\overline{M}_w/\overline{M}_n$ of about 1.63 and a $\overline{M}_z/\overline{M}_w$ of about 1.2 is prepared in a tubular reactor under the following conditions:

| | |
|---|---|
| Reactor Inlet Temp (°F.) | 33 |
| Reactor Outlet Temp (°F.) | 99 |
| Sidestream Feed Temp.(°F.) | 23 |
| Catalyst Premix Temp (°F.) | 48 |
| Catalyst Premix Time (Sec.) | |
| Reactor Residence Time (Sec.) at Sidestream 1/2/3/4/5 | 0.56/1.0/1.1/1.22/1.34 |
| Inlet Feed Rates (Klb./hr.) | |
| Hexane | 139 |
| Ethylene | 0.49 |
| Propylene | 5.57 |
| VCl$_4$ | 0.039 |
| Al$_2$(C$_2$H$_5$)$_3$ Cl$_3$ | 1.26 |
| Sweep Hexane | 6.5 |
| Sidestream Feed Rates (Klb./hr.) | |
| Hexane | 61 |
| Ethylene | 4.1 |
| Propylene | 7.1 |
| Total Hexane (Klb./hr.) | 206 |
| Sidestream Feed Splits (wt. %) Sidestream 1/2/3/4/5 | 10.9/31.2/15/17.7/24.7 |

About 300 grams of this ethylene-propylene copolymer is masticated under an air atmosphere at 150° C. for a period of about 2 hours in a laboratory masticator. The resultant degraded copolymer has a T.E. of about 1.6, $\overline{M}_w$ of about 67,000, and a $\overline{M}_z/\overline{M}_w$ of about 1.6.

Two hundred grams of this degraded copolymer are dissolved in 800 grams of S100NLP mineral oil in a reactor flask under a nitrogen atmosphere while heating to 175° C. to make a 20 wt. % copolymer solution. Twenty grams of maleic anhydride are charged to the reactor in 4 equal portions, each portion consisting of 5 grams of maleic anhydride. After each charge of maleic anhydride 0.5 gram of di-t-butyl peroxide initiator are charged to the reactor (total charge amount of di-t-butyl peroxide charged to the reactor is 2 grams). The resulting reaction mixture is reacted at 175° C. under a nitrogen atmosphere for ½ hour. The reaction mixture is then stripped with nitrogen for 1.5 hours to remove remaining unreacted maleic anhydride. The maleic anhydride functionality (total acidity) is determined to be 0.124 meq/g. by standard acid-base titration.

Into a reactor vessel are placed 101.84 grams of this succinic anhydride grafted degraded ethylene-propylene reaction product composition (grafted copolymer in oil solution). This solution is then heated to 175° C. under a nitrogen atmosphere. Into this reactor vessel are added 21 grams of a 50/50 solution of polyisobutenyl succinic anhydride (having a functionality of about 1.05, a polyisobutene $\overline{M}_n$ of about 950, a Saponification Number of 112, and containing about 12% unreacted polyisobutene) and S100NLP mineral oil. The resulting reaction mixture is stirred for 30 minutes. Then 1.95 grams of amido-amine prepared in accordance with the procedure of Example 1 are added to the reaction mixture. This reaction mixture is then heated at 175° C. for 20 minutes. The reaction mixture is then stripped with nitrogen for 45 minutes. After stripping of the reaction mixture, 1.21 grams of dodecenyl succinic anhydride is added to the reaction mixture, and the reaction mixture is soaked for 30 minutes. Sufficient S100NLP mineral oil is added to the reaction mixture to provide a solution having a KV at 100° C. of 1156 centistokes. The SSI of the nitrogen containing grafted degraded ethylene-propylene copolymer is determined to be 31%.

A 10W40 viscosity grade lubricating oil composition containing 14.5 wt. % of the diluted reaction product containing composition prepared as described above and a conventional detergent inhibitor package is prepared. The KV at 100° C. in centistokes, CCS, and MRV of this lubricating oil composition are determined and the results are set forth in Table 1.

MRV (Mini Rotary Viscometer), is determined using a technique described in ASTM-D3829, and measures viscosity in centipoise. MRV was determined at −25° C.

CCS (Cold Cranking Simulator), is determined using a technique described in SAE J300 Appendix, and is a high shear viscosity measurement in centipoise. This test is related to a lubricating oil's resistance to cold engine starting. The higher the CCS, the greater the oil's resistance to cold engine starting.

TP-1 is determined using a technique described in ASTM-D4684. This is essentially the same as the MRV noted above except that a slow cooling cycle is used. The cycle is defined in SAE Paper No. 850443, K. O. Henderson et al.

MRV and CCS are indicative of the low temperature viscometric properties of oil compositions.

Shear Stability Index (SSI) measures the mechanical stability of polymers used as V.I. improvers in crankcase lubricants subjected to high strain rates. The diesel fuel injector test was used (CEC L-14-A-79, ASTM D 3945, equivalent to DIN 51382). To determine SSI, the polymer under test is dissolved in a suitable base oil (for example, a solvent extracted 150 neutral) to a relative viscosity of 2 to 3 at 100° C. The oil solutions is then circulated through a diesel fuel injector, for a total of thirty passes. The SSI is calculated from the initial 100° C. kinematic viscosity ($V_i$), the final kinematic viscosity ($V_f$), and the base oil viscosity ($V_b$), as SSI (%)=100×($V_i$−$V_f$)/($V_i$−$V_b$). A reference sample (as required by the DIN method) is used to calibrate the test. The SSI is indicative of the resistance of a polymer to molecular weight degradation by shearing forces. The higher the SSI, the less stable the polymer, i.e., the more susceptible it is to molecular weight distribution.

Thickening Efficiency (T.E.), as used herein, is defined as the ratio of the weight percent of a polyisobutylene (sold as an oil solution by Exxon Chemical Co. as Paratone N), having a Staudinger Molecular Weight of 20,000, required to thicken a solvent-extracted neutral mineral lubricating oil, having a viscosity of 150 SUS at 37°–8° C., a viscosity index of 105 and an ASTM pour point of 37.8° F., (Solvent 150 Neutral) to a viscosity of 12.4 centistokes at 98.9° C., to the weight percent of a test copolymer required to thicken the same oil to the same viscosity at the same temperature. T.E. is related to $\overline{M}_w$ or $\overline{M}_y$ and is a convenient, useful measurement for formulation of lubricating oils of various grades.

The following Comparative Example illustrates a conventional nitrogen containing succinic anhydride grafted ethylene-propylene copolymer derived from a conventional non-narrow MWD ethylene propylene copolymer falling outside the scope of the instant invention.

COMPARATIVE EXAMPLE 3

A conventional ethylene-propylene copolymer falling outside the scope of the instant invention having an ethylene content of about 44%, a T.E. of about 2.8, a SSI of about 50, a $\overline{M}_w$ of about 153,000, a $\overline{M}_n$ of about 80,000, a $\overline{M}_w/\overline{M}_n$ of about 1.91, and a $\overline{M}_z/\overline{M}_w$ of about 1.88 is masticated under an air atmosphere at 150° C. for a period of about 2 hours in a laboratory masticator. The resultant degraded copolymer has a T.E. of about 1.2, a $\overline{M}_w$ of about 62,000, a $\overline{M}_n$ of about 33,000, a $\overline{M}_w/\overline{M}_n$ of about 1.88, and a $\overline{M}_z/\overline{M}_w$ of about 1.78.

Two hundred grams of this degraded copolymer are dissolved in 800 grams of S100NLP mineral oil in a reactor flask under a nitrogen atmosphere while heating to 175° C. to make a 20 wt. % copolymer solution. Twenty grams of maleic anhydride are charged to the reactor in 4 equal portions, each portion consisting of 5 grams of maleic anhydride. After each charge of maleic anhydride 0.5 gram of di-t-butyl peroxide initiator are charged to the reactor (total charge amount of di-t-butyl peroxide charged to the reactor is 2 grams). The resulting reaction mixture is reacted at 175° C. under a nitrogen atmosphere for ½ hour. The reaction mixture is then stripped with nitrogen for 1.5 hours to remove remaining unreacted maleic anhydride. The maleic anhydride functionality (total acidity) is determined to be 0.098 meq/g. by standard acid-base titration.

Into a reactor vessel are placed 150 grams of this succinic anhydride grafted degraded ethylene-propylene reaction product composition (grafted copolymer in oil solution). This solution is then heated to 175° C. under a nitrogen atmosphere. Into this reactor vessel are added 21 grams of a 50/50 solution of polyisobutenyl succinic anhydride (having a functionality of about 1.05, a polyisobutene $\overline{M}_n$ of about 950, a Saponification Number of 112, and containing about 12% unreacted polyisobutene) and S100NLP mineral oil. The resulting reaction mixture is stirred for 30 minutes. Then 2.9 grams of amido-amine prepared in accordance with the procedure of Example 1 are added to the reaction mixture. This reaction mixture is then heated at 175° C. for 20 minutes. The reaction mixture is then stripped with nitrogen for 45 minutes. After stripping of the reaction mixture, 1.21 grams of dodecenyl succinic anhydride is added to the reaction mixture, and the reaction mixture is soaked for 30 minutes. Sufficient S100NLP mineral oil is added to the reaction mixture to provide a solution having a KV at 100° C. of 930 centistokes. The SSI of the nitrogen containing grafted degraded ethylene-propylene copolymer is determined to be 16%.

A 10W40 viscosity grade lubricating oil composition containing 13.0 wt. % of the diluted reaction product containing composition prepared as described above and a conventional detergent inhibitor package is prepared. The KV at 100° C. in centistokes, CCS, and MRV of this lubricating oil composition are determined and the results are set forth in Table 1.

TABLE 1

| | SSI (%) | KV (cSt) | CCS (cP) | MRV (cP) |
|---|---|---|---|---|
| Example No. 2 | 31 | 14.44 | 2666 | 12,277 |
| Comparative Example No. 3 | 16 | 14.58 | 3668 | 29,911 |

As illustrated by the data in Table 1, the nitrogen containing grafted degraded ethylene-propylene copolymer of the instant invention provides lubricating oil composition (Example 2) exhibiting much better low temperature viscometric properties than an oil composition containing a conventional nitrogen containing grafted degraded ethylene-propylene copolymer falling outside the scope of the instant invention (Comparative Example 3).

What is claimed is:

1. A composition of matter comprising reaction product of:
   (i) (a) molecular weight degraded ethylene-alpha-olefin copolymer obtained by degrading copolymer of ethylene and at least one other alpha-olefin monomer, said copolymer comprising intramolecularly heterogeneous copolymer chains containing at least one crystallizable segment of methylene units and at least one low crystallinity ethylene-alpha-olefin copolymer segment, wherein said at least one crystallizable segment comprises at least 10 weight percent of said copolymer chain and contains at least about 57 weight percent ethylene, wherein said low crystallinity segment contains not greater than about 53 weight percent ethylene, and wherein said copolymer has a molecular weight distribution characterized by at least one of a ratio of $\overline{M}_w/\overline{M}_n$ of less than 2 and a ratio of $\overline{M}_z/\overline{M}_w$ of less than 1.8, and wherein at least two portions of an individual intramolecularly heterogeneous chain, each portion comprising at least 5 weight percent of said chain, differ in composition from one another by at least 7 weight percent ethylene; said degraded copolymer grafted with (b) ethylenically monounsaturated carboxylic acid material having 1 to 2 carboxylic acid groups or anhydride group to form grafted ethylene copolymer,
   (ii) about $C_{50}$ to about $C_{400}$ hydrocarbyl substituted carboxylic acid component containing 1 to 2 carboxylic acid groups or anhydride group;
   (iii) thioamido-amine comprising reaction product of (a) polyalkylene polyamine, and (b) alpha, beta-unsaturated compound represented by the formula

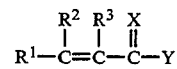

wherein X is sulfur, Y is —OR$^4$, —SR$^4$ or

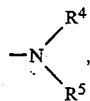

and $R^1$, $R^2$, $R^3$, $R^4$, and $R^5$ are independently selected from hydrogen, hydrocarbyl, and substituted hydrocarbyl; and (iv) $C_{12}$ to about $C_{18}$ hydrocarbyl substituted dicarboxylic anhydride.

2. The composition of matter according to claim 1 wherein (iv) comprises $C_{12}$ to about $C_{18}$ hydrocarbyl substituted succinic anhydride.

3. The composition of matter according to claim 2 wherein said $C_{12}$ to about $C_{18}$ hydrocarbyl substituted succinic anhydride comprises $C_{12}$ to about $C_{18}$ alkenyl substituted succinic anhydride.

4. The composition of matter according to claim 1 wherein (iv) comprises $C_{12}$ to about $C_{18}$ alkenyl substituted succinic anhydride and wherein said polyalkylene polyamine (iii) (a) comprises polyamines containing from 2 to about 60 carbon atoms and from 2 to about 12 nitrogen atoms per molecule.

5. An oleaginous composition comprising:
   (1) oleaginous material and
   (2) multifunctional viscosity index improver comprised of reaction product of
   (i) (a) degraded ethylene-alpha-olefin copolymer obtained by degrading copolymer of ethylene and at least one other alpha-olefin monomer, said copolymer comprising intramolecularly heterogeneous copolymer chains containing at least one crystallization segment of methylene units and at least one low crystallinity ethylene-alpha-olefin copolymer segment, wherein said at least one crystallizable segment comprises at least about 10 weight percent of said copolymer chain and contains at least about 57 weight percent ethylene, wherein said low crystallinity segment contains not greater than about 53 weight percent ethylene, and wherein said copolymer has a molecular weight distribution characterized by at least one of a ratio of $\overline{M}_w/\overline{M}_n$ of less than 2 and a ratio of $\overline{M}_z/\overline{M}_w$ of less than 1.8, and wherein at least two portions of an individual intramolecularly heterogeneous chain, each portion comprising at least 5 weight percent of said olefin, differ in composition from one another by at least 7 weight percent ethylene, said copolymer grafted with (b) ethylenically monounsaturated carboxylic acid material having 1 to 2 carboxylic acid groups or anhydride group to form grafted ethylene copolymer; and (ii) about $C_{50}$ to about $C_{400}$ hydrocarbyl substituted carboxylic acid component containing one to two carboxylic acid groups or anhydride group;

(iii) thioamido-amine comprising reaction product of (a) polyalkylene polyamine, and (b) alpha, beta-unsaturated compound of the formula:

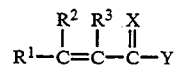

wherein X is sulfur, Y is $-OR^4$, $-SR^4$ or

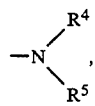

and $R^1$, $R^2$, $R^3$, $R^4$, and $R^5$ are the same or different and are hydrogen or substituted or unsubstituted hydrocarbyl; and viscosity stabilizing effective amount of (iv) $C_{12}$ to about $C_{18}$ hydrocarbyl substituted dicarboxylic anhydride.

6. The composition according to claim 5 wherein (iv) comprises $C_{12}$ to about $C_{18}$ hydrocarbyl substituted succinic anhydride.

7. The composition according to claim 1 wherein (iv) comprises $C_{12}$ to about $C_{18}$ alkenyl substituted succinic anhydride.

* * * * *